(12) United States Patent
Busbee

(10) Patent No.: US 11,845,217 B2
(45) Date of Patent: Dec. 19, 2023

(54) 3D-PRINTING USING REACTIVE PRECURSORS

(71) Applicant: Kornit Digital Technologies Ltd., Rosh HaAyin (IL)

(72) Inventor: Travis Alexander Busbee, Somerville, MA (US)

(73) Assignee: Kornit Digital Technologies Ltd., Rosh HaAyin (IL)

(*) Notice: Subject to any disclaimer, the term of this patent is extended or adjusted under 35 U.S.C. 154(b) by 763 days.

(21) Appl. No.: 16/162,318

(22) Filed: Oct. 16, 2018

(65) Prior Publication Data

US 2019/0152133 A1 May 23, 2019

Related U.S. Application Data

(60) Provisional application No. 62/572,810, filed on Oct. 16, 2017.

(51) Int. Cl.
*B29C 64/112* (2017.01)
*C09D 11/322* (2014.01)
(Continued)

(52) U.S. Cl.
CPC ............ *B29C 64/112* (2017.08); *B29C 64/10* (2017.08); *B29C 64/106* (2017.08);
(Continued)

(58) Field of Classification Search
CPC ... B29C 64/112; B29C 64/245; B29C 64/295; B29C 64/209; B29C 64/10;
(Continued)

(56) References Cited

U.S. PATENT DOCUMENTS 5,184,307 A * 2/1993 Hull ...................... G03F 7/0037
700/182
2016/0263827 A1* 9/2016 Fripp .................... B29C 64/124
(Continued)

FOREIGN PATENT DOCUMENTS

CN 106738920 A 5/2017
JP 2007-106070 A 4/2007
(Continued)

OTHER PUBLICATIONS

Google translation of WO2009139395A1 "Process for producing three-dimensional shaped object, material for three-dimensional shaping, and three-dimensional shaped object" Nov. 19, 2009 to Kakino et al. (Year: 2009).*
(Continued)

*Primary Examiner* — Joseph S Del Sole
*Assistant Examiner* — John Robitaille

(57) ABSTRACT

The present disclosure is related to methods for forming 3D-printed articles and associated systems. In some embodiments, a method may comprise depositing a first liquid comprising first molecules having first functional groups onto a portion of a second liquid comprising second molecules having second functional groups such that the first functional groups react with the second functional groups to form a solid material or layer. The portion of the second liquid onto which the first liquid is deposited is positioned over a platform that is at least partially submerged within the second liquid. In some embodiments, a system may comprise a nozzle configured to expel a first liquid, a vessel configured to contain a second liquid, and a platform configured to be translated through at least a portion of the depth of the vessel when the vessel comprises the second liquid.

20 Claims, 9 Drawing Sheets

(51) Int. Cl.
| | |
|---|---|
| *B29C 64/209* | (2017.01) |
| *B29C 64/295* | (2017.01) |
| *B29C 64/245* | (2017.01) |
| *B29C 64/10* | (2017.01) |
| *B29C 64/205* | (2017.01) |
| *C09D 11/38* | (2014.01) |
| *B29C 64/106* | (2017.01) |
| *C09D 11/102* | (2014.01) |
| *B33Y 10/00* | (2015.01) |
| *B33Y 30/00* | (2015.01) |
| *B33Y 70/00* | (2020.01) |

(52) U.S. Cl.
CPC .......... *B29C 64/205* (2017.08); *B29C 64/209* (2017.08); *B29C 64/245* (2017.08); *B29C 64/295* (2017.08); *B33Y 10/00* (2014.12); *B33Y 30/00* (2014.12); *B33Y 70/00* (2014.12); *C09D 11/102* (2013.01); *C09D 11/322* (2013.01); *C09D 11/38* (2013.01)

(58) Field of Classification Search
CPC ..... B29C 64/106; B29C 64/205; B33Y 10/00; B33Y 30/00; B33Y 70/00; C09D 11/102; C09D 11/322; C09D 11/38
See application file for complete search history.

(56) References Cited

U.S. PATENT DOCUMENTS

| | | |
|---|---|---|
| 2019/0037960 A1 | 2/2019 | Busbee |
| 2019/0037961 A1 | 2/2019 | Busbee et al. |
| 2019/0039311 A1 | 2/2019 | Busbee et al. |
| 2019/0047213 A1 | 2/2019 | Stadlmann |

FOREIGN PATENT DOCUMENTS

| | | |
|---|---|---|
| JP | 2017-094714 A | 6/2017 |
| WO | WO 2009/139395 A1 | 11/2009 |
| WO | WO 2016/179491 A1 | 11/2016 |
| WO | WO 2017/161398 | 9/2017 |
| WO | WO 2019/079293 | 4/2019 |

OTHER PUBLICATIONS

Extended European Search Report for EP Application No. EP 18868225.6 dated Jun. 4, 2021.
International Search Report and Written Opinion for PCT/US2018/056075 dated Jan. 3, 2019.
You et al. Ultrasonic hammer produces hot spots in solids. Nat Commun. Apr. 2, 2015;6:6581.

* cited by examiner

3D-PRINTING USING REACTIVE PRECURSORS

RELATED APPLICATIONS

This application claims priority under 35 U.S.C. § 119(e) to U.S. Provisional Application No. 62/572,810, filed Oct. 16, 2017, and entitled "3D-Printing Using Reactive Precursors", which is incorporated herein by reference in its entirety for all purposes.

TECHNICAL FIELD

Articles, systems, and methods related to 3D-printing are generally described.

BACKGROUND 3D-printing is a technique that may be used to manufacture a wide variety of consumer products. Many 3D-printing methods and systems require the use of inks with specific compositions and/or require the incorporation of pre-formed particles into the final product. These limitations reduce the variety of materials that can be 3D-printed, and may make it challenging to 3D-print materials with desirable compositions and/or properties.

Accordingly, improved methods and systems for 3D-printing are desirable.

SUMMARY

The present invention generally relates to methods for 3D-printing and associated systems. Certain embodiments are related to methods for 3D-printing in which a first molecule having a first functional group reacts with a second molecule having a second functional group to form a solid material, such as a solid layer. In some cases, systems for 3D-printing are provided. The subject matter of the present invention involves, in some cases, interrelated products, alternative solutions to a particular problem, and/or a plurality of different uses of one or more systems and/or articles.

In one set of embodiments, methods for forming 3D-printed articles are provided. A method for forming a 3D-printed article may comprise depositing a first liquid comprising first molecules having first functional groups onto a portion of a second liquid comprising second molecules having second functional groups such that the first functional groups react with the second functional groups to form a solid material in a pattern (e.g., a pre-determined pattern). The portion of the second liquid may be positioned over a platform that is at least partially submerged within the second liquid.

In another embodiment, a method for forming a 3D-printed article comprises depositing a first liquid comprising first molecules having first functional groups onto a portion of a second liquid comprising second molecules having second functional groups such that the first functional groups react with the second functional groups to form a solid layer having an average thickness of less than 200 microns. The portion of the second liquid may be positioned over a platform that is at least partially submerged within the second liquid.

According to certain embodiments, a method for forming a 3D-printed article comprises depositing a first liquid onto a portion of a second liquid to initiate a chemical reaction resulting in the formation of a solid layer, wherein the portion of the second liquid is positioned over a platform that is at least partially submerged within the second liquid.

In another set of embodiments, systems for 3D-printing are provided. A system for 3D-printing may comprise a nozzle configured to expel a first liquid; a vessel configured to contain a second liquid, the vessel being substantially free of leaks with respect to the second liquid; and a platform configured to be translated through at least a portion of the depth of the vessel when the vessel comprises the second liquid. The nozzle and the platform may be configured such that the first liquid expelled by the nozzle is directed toward the platform.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
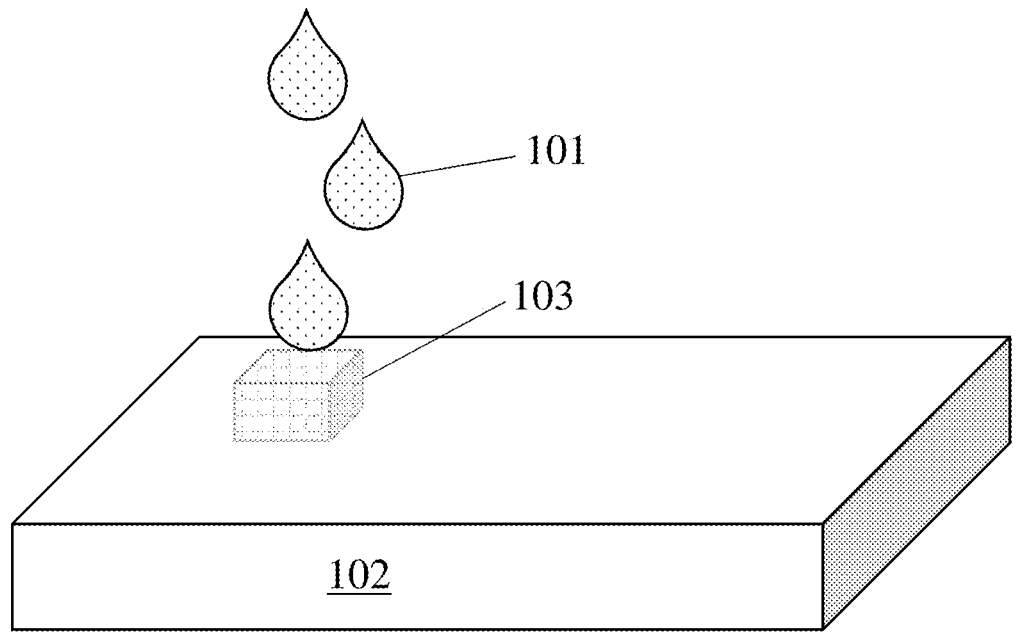
FIGS. 1A-1B depict a method of forming a solid material, according to certain embodiments.

Methods for three-dimensional printing (3D-printing) and associated systems are generally described herein. Certain methods relate to forming 3D-printed articles by depositing a first liquid comprising first molecules having first functional groups onto a portion of a second liquid comprising second molecules having second functional groups such that the first functional groups react with the second functional groups. The reaction between the first and second functional groups can lead to the formation of a solid material (e.g., in the form of a solid layer), which can form all or a portion of a 3-D printed object. A 3D-printed article formed by such a method may comprise features at locations where the first functional group reacted with the second functional group, and/or may comprise voids at locations where the first functional group did not react with the second functional group. By depositing the first liquid onto the second liquid at selected locations and/or selectively reacting the first functional groups with the second functional groups in a spatially-varying manner, 3D-printed articles with desirable features and compositions may be formed.

In certain embodiments, the methods described herein may be suitable for 3D-printing articles that may be challenging to 3D-print by other methods. For example, the methods may be suitable for 3D-printing articles from inks that are not photoresponsive, or from inks that do not include substantial amounts of thermoplastic polymers. As another example, the methods and/or systems may be employed to 3D-print articles that do not include embedded particles, or for which embedded particles make up a fairly small percentage of the total weight. As a third example, the methods may be suitable for 3D-printing articles for which acceptable ink compositions are challenging to formulate, such as materials that form rapidly from their precursors. In some embodiments, the methods described herein may encompass multiple reactions and/or types of reactions, at least one of which may be challenging to effect by other 3D-printing methods. In some embodiments, a first reaction (e.g., a reaction not traditionally used in 3D-printing) may be separated in time from a second reaction of a different type (e.g., a reaction not traditionally used in 3D-printing or a reaction traditionally used in 3D-printing).

Some embodiments described herein relate to systems for 3D-printing. In some embodiments, the systems described herein may be capable of performing one or more of the methods described herein and/or may be configured to perform one or more of the methods described herein. In other cases, the methods may be performed on systems lacking one or more (or all) of the components described herein, and/or the systems described herein may be used to perform methods other than those described herein.

In some embodiments, a method and/or system as described herein may be employed to 3D-print an article with utility for one or more commercial applications. For example, a method and/or system may be employed to 3D-print an article for use in one or more of the following applications: footwear, wearable devices, foams, auto parts, medical devices, robotic devices, and shock absorbers.

Figure 1B:
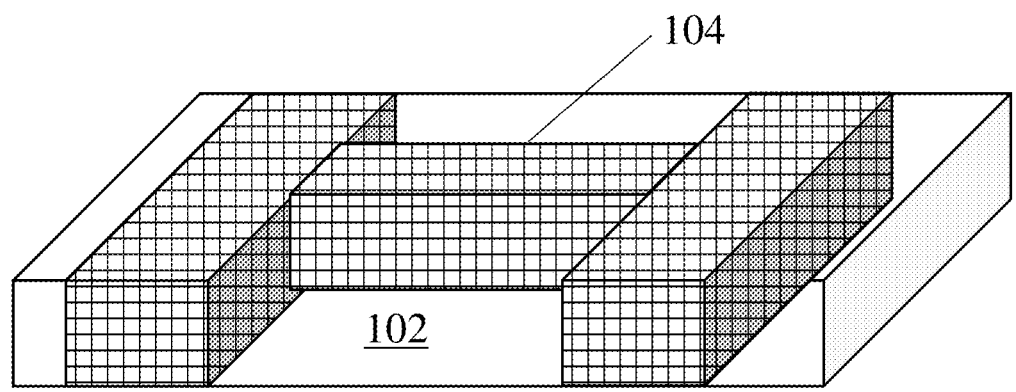

As described above, in some embodiments a method as described herein may comprise forming a solid material (e.g., in the form of a solid layer) by depositing a first liquid onto a portion of a second liquid. The first liquid may comprise first molecules reactive with second molecules in the second liquid. For example, the first molecules may comprise first functional groups that are reactive with second functional groups of the second molecules. The first and second molecules, and/or first and second functional groups, may react with each other to form one or more solid features that may form part of a solid material or layer. FIGS. 1A and 1B show one non-limiting embodiment of a method of forming a solid material, in which first liquid 101 is deposited onto portion 103 of second liquid 102. Although not shown, first liquid 101 may comprise a first molecule with first functional groups and second liquid 102 may comprise a second molecule with second functional groups. During and/or at the conclusion of deposition of first liquid 101 onto portion of second liquid 102, solid material 104 is formed. It should be understood that FIGS. 1A and 1B are exemplary and that certain methods may comprise additional steps and/or components or may not include every feature of FIGS. 1A and 1B. For example, although the first liquid is in the form of droplets in FIG. 1A (and the first liquid may be in the form of droplets in some methods), in other methods the first liquid may be deposited onto the second liquid while in a different form (e.g., a jet, a filament, an aerosol). In some cases, the liquid may be in the form of droplets upon expulsion from the nozzle, but may be supplied to the nozzle as a continuous stream. As another example, the solid material formed by some methods may have a different geometry than that shown in FIG. 1B.

In some embodiments, a solid material formed by a method as described herein may be in the form of a pattern. For example, the solid material may be formed in a pre-determined pattern. As used herein, a pre-determined pattern refers to a structure that is not random, and is at least partially determined prior to beginning performance of the method. In some cases, the pre-determined pattern may be wholly determined prior to the beginning of the performance of the method, while in other cases the pre-determined pattern may be partially determined prior to beginning performance of the method. For example, the pre-determined pattern may be partially determined prior to the beginning of the performance of the method, but feedback obtained during the method may be used to determine other portions of the pattern and/or to adjust the pattern. The pre-determined pattern may be selected by a person or instrument configured to carry out a method described herein, such as an industrial designer, a technician, a software algorithm, and the like. The pattern may be a repeating pattern, such as a lattice structure, or a non-repeating pattern, such as a pattern with quasicrystal symmetry or a pattern including one or more pre-determined features that are not repeating. In some embodiments, the pattern may be a foam (e.g., an open cell foam).

One example of a suitable pattern (e.g., a pre-determined pattern) is a lattice structure in which each plane comprises one or more repeating features. In some such embodiments, different planes may have different repeating features. For example, the pattern (e.g., pre-determined pattern) could comprise repeating features (e.g., circles, ellipses, lines, polygons (e.g., regular or otherwise, such as squares, triangles, pentagons, etc.)) in the bottommost layer, and progressively smaller and/or closer together features (e.g., smaller and/or closer together circles, ellipses, lines, polygons) in progressively higher layers. In some embodiments, the top layer of the pattern (e.g., pre-determined pattern) comprises geometric shapes (e.g., circles, polygons, dots, and the like). A pattern (e.g., pre-determined pattern) with this structure may form an open cell foam. In some such embodiments, the open cell foam comprises pores oriented at an angle other than 90° (e.g., less than 85°, less than 80°, less than 75°, less than 45°, or smaller) to the outer surface of the open cell foam.

In some embodiments, the widths of one or more features in a pattern (e.g., a pre-determined pattern) may be affected by the volume of a first liquid that reacts to form them. In other words, the volume of the first liquid that reacts to form a solid feature may affect the width of that solid feature. For example, in some embodiments the first liquid may be in the form of one or more droplets, and the radius of the droplets may be roughly equivalent to the width of the features formed by reaction of the first liquid within the droplets with the second liquid.

Figure 1C:
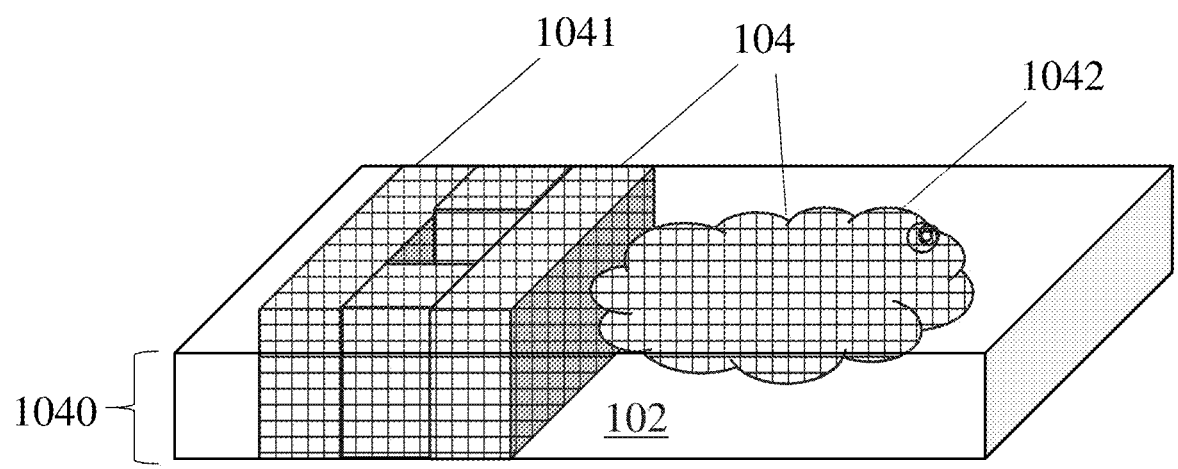
FIGS. 1C-1D depict solid materials, according to certain embodiments.
Figure 1D:
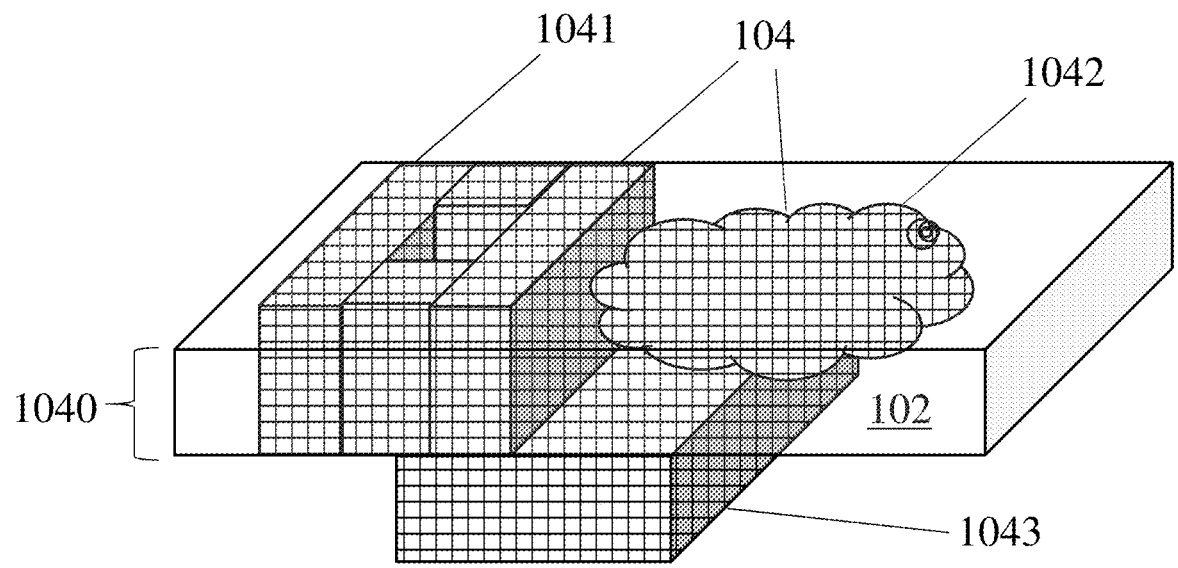

In some embodiments, a solid material formed from the reaction of the first functional groups and the second functional groups can form all or a portion of one or more solid layers. The solid material may be a solid layer, may be a portion of a solid layer, and/or may comprise one or more solid layers. It should be understood that references to solid materials herein may refer to any or all of these types of solid materials. For example, a solid material may be in the form of a solid layer for which at least a portion is formed in a pattern (e.g., a pre-determined pattern). A non-limiting example of a solid material with this structure is shown in FIG. 1C, in which solid material 104 is in the form of solid layer 1040 that comprises portion 1041 and comprises portion 1042. Portion 1041 is in a pre-determined pattern and portion 1042 is not in a pre-determined pattern. As another example, a solid material may include a solid layer for which at least a portion is formed in a pre-determined pattern. A non-limiting example of a solid material with this structure is shown in FIG. 1D, in which solid material 104 comprises solid layer 1040 disposed on portion 1043 of the solid material. As a third example, a solid material may be a portion of a solid layer that includes portions that are formed in a pre-determined pattern. For example portion 1041 or 1042 of solid layer 1040 as shown in FIGS. 1C and 1D may be solid materials as described herein. Certain methods may be used to form 3D-printed articles by sequentially depositing successive solid layers on top of each other, as described further below.

In some embodiments, a method as described herein may be performed as part of an additive manufacturing process in which a 3D-printer manufactures a solid material by successively forming a series of solid layers in accordance with a model of the object to be manufactured. Each solid layer may be formed such that it adheres to one or more previously formed solid layers or a platform upon which the solid material is built. Some solid layers may be formed directly on top of one or more preceding solid layers such that the solid layers are parallel with each other. Other solid layers may be formed on one or more solid layers that have been rotated, which may result in the formation of a solid layer on a side of the solid material that is perpendicular to one or more previously formed solid layers.

Solid layers formed by methods as described herein may include one or more advantageous features. As an example, in some embodiments a solid layer formed by a method described herein may not be a continuous layer. As used herein, a layer that is not a continuous layer is a layer for which at least a first portion is not topologically connected to at least a second portion through the layer. Layers that are not continuous may be topologically connected to each other through other portions of an article of which they are a part, such as through other layers on which they are disposed or other layers disposed on them. In other cases, a method described herein may be used to form a solid layer that is continuous. In some cases, a method described herein may be used to form a solid material that comprises some layers that are continuous and some layers that are not continuous.

As another example, certain of the methods described herein may be used to form a solid layer comprising one or more voids. When present, the voids may have any suitable size. In some embodiments, a method may comprise forming one or more voids with a volume of greater than or equal to 0.1 cubic microns, greater than or equal to 1 cubic micron, greater than or equal to 10 cubic microns, greater than or equal to 100 cubic microns, greater than or equal to $10^3$ cubic microns, greater than or equal to $10^4$ cubic microns, greater than or equal to $10^5$ cubic microns, greater than or equal to $10^6$ cubic microns, greater than or equal to $10^7$ cubic microns, greater than or equal to $10^8$ cubic microns, greater than or equal to 1 cubic millimeter, greater than or equal to 10 cubic millimeters, greater than or equal to 100 cubic millimeters, greater than or equal to 1 cubic centimeter, greater than or equal to 10 cubic centimeters, or greater than or equal to 100 cubic centimeters. The voids may have a volume of less than or equal to $10^3$ cubic centimeters, less than or equal to 100 cubic centimeters, less than or equal to 10 cubic centimeters, less than or equal to 1 cubic centimeter, less than or equal to 100 cubic millimeters, less than or equal to 10 cubic millimeters, less than or equal to 1 cubic millimeter, less than or equal to $10^8$ cubic microns, less than or equal to $10^7$ cubic microns, less than or equal to $10^6$ cubic microns, less than or equal to $10^5$ cubic microns, less than or equal to $10^4$ cubic microns, less than or equal to $10^3$ cubic microns, less than or equal to 100 cubic microns, less than or equal to 10 cubic microns, or less than or equal to 1 cubic micron. Combinations of the above-referenced ranges are also possible (e.g., greater than or equal to 0.1 cubic microns and less than or equal to $10^3$ cubic centimeters). Other ranges are also possible. In some embodiments, a solid layer may comprise voids of more than one size (e.g., the solid layer may comprise one void that is smaller than another void in the layer (e.g., by at least 10%, at least 20%, or at least 50%, relative to the larger void)).

In some cases, a method described herein may be used to form two or more solid layers disposed on top of each other and which comprise voids that are aligned with each other. In other words, voids may pass through two or more solid layers disposed on top of each other.

Layers formed by methods described herein may have a variety of suitable thicknesses. In some embodiments, a method include the formation of a solid layer with an average thickness of less than or equal to 200 microns, less than or equal to 100 microns, less than or equal to 50 microns, or less than or equal to 20 microns. In some embodiments, a method may include the formation of a solid layer with an average thickness of greater than or equal to 10 microns, greater than or equal to 20 microns, greater than or equal to 50 microns, or greater than or equal to 100 microns. Combinations of the above-referenced ranges are also possible (e.g., less than or equal to 200 microns and greater than or equal to 10 microns). Other ranges are also possible. As used herein, references to the thicknesses of solid layers refer to the average thicknesses of the solid portions of the layers. For example, the (zero) thickness of any voids in a layer would not be included in the calculation of the average thickness of a layer including voids and open portions of a lattice (portions with zero thickness) would not be included in the calculation of an average thickness of a layer including a lattice with open portions.

Figure 2A:
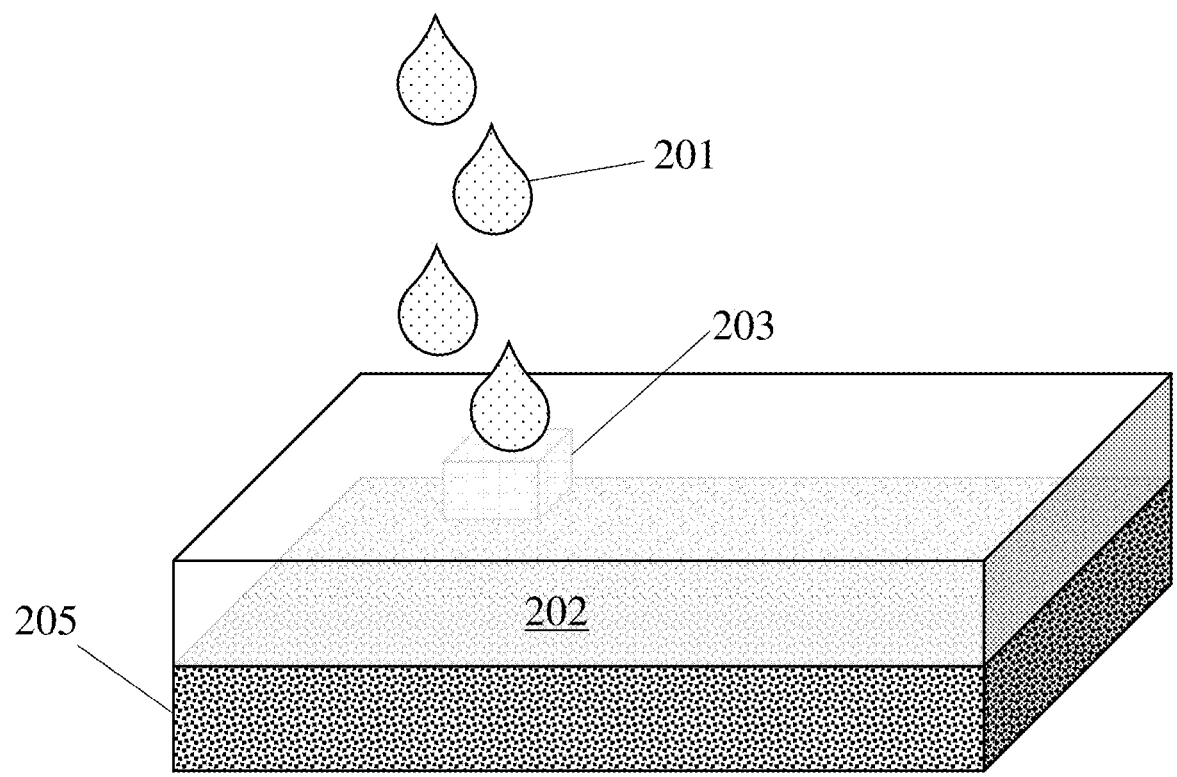
FIGS. 2A-2B depict a method of forming a solid material on a platform, according to certain embodiments.
Figure 2B:
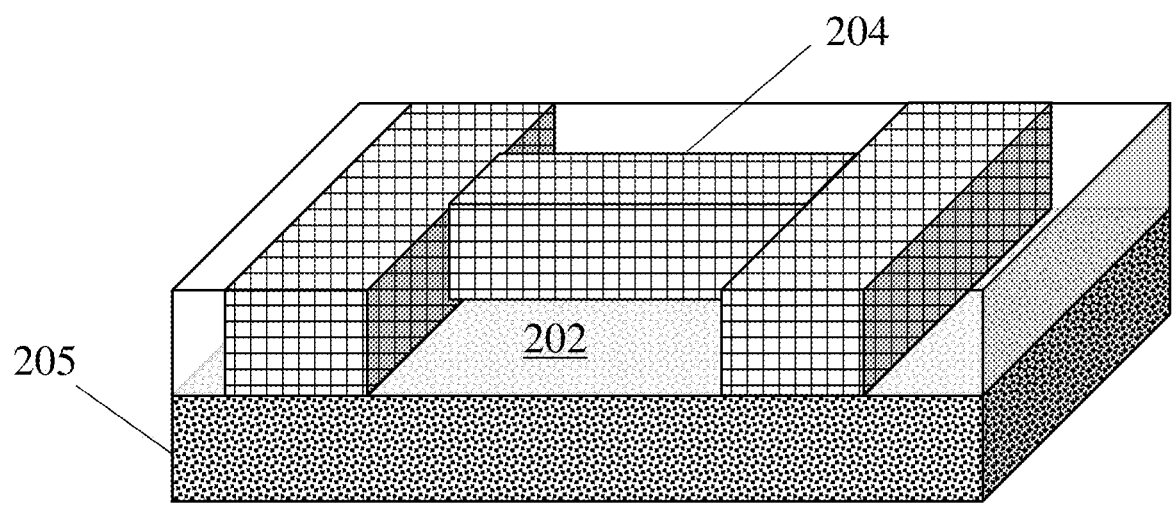

According to certain inventive methods, a portion of a second liquid is positioned over a platform that is at least partially submerged within the second liquid. FIGS. 2A and 2B show one non-limiting embodiment of a method in which first liquid 201 is deposited onto portion 203 of second liquid 202 positioned over platform 205. During and/or at the conclusion of deposition of first liquid 201 onto portion 203 of second liquid 202, according to some such embodiments, solid material 204 is formed. Although FIGS. 2A and 2B show a configuration in which the entirety of the second liquid is disposed on the platform, in some cases a portion of the second liquid may be positioned over the platform but the orientation of the second liquid with respect to the platform may be different than that shown in FIGS. 2A and 2B. For example, in some embodiments one or more of the following configurations may be present: the platform may be at least partially or fully submerged in the second liquid, the platform may be oriented at an angle such that the thickness of the portion of the second liquid positioned over the platform may spatially vary, the second liquid may not fully cover the platform, and the like. Along similar lines, it should be understood that the platform design may be different than that shown in FIGS. 2A and 2B, as will be described in further detail below.

Figure 2C:
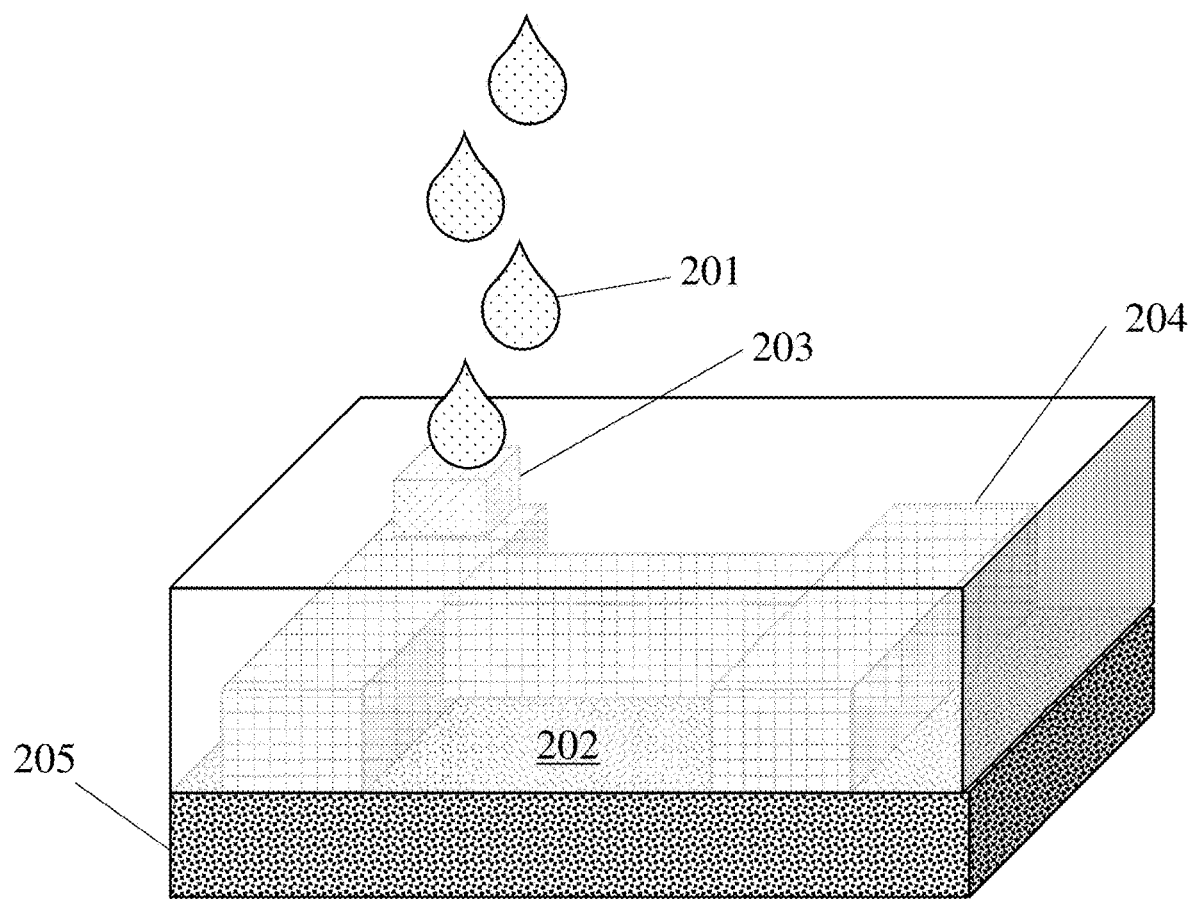
FIGS. 2C-2D depict a method of forming a solid material on an object disposed on a platform, according to certain embodiments.
Figure 2D:
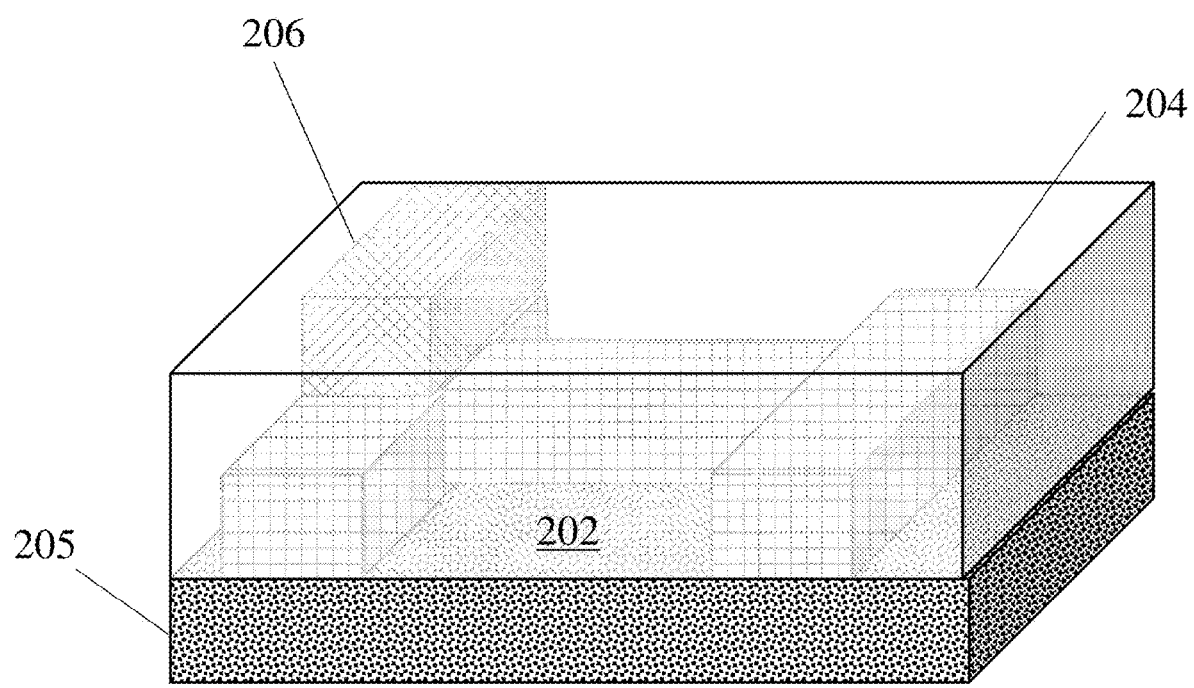

In some embodiments in which a portion of the second liquid is positioned over a platform that is at least partially submerged within the second liquid, a solid material (e.g., a solid layer) may be formed on the platform. The solid material (e.g., the solid layer) may be formed directly on the platform, or may be formed onto an object disposed on the platform (e.g., a solid material such as a solid layer formed by a method described herein, a solid material such as a solid layer formed by a different 3D-printing process, a solid material such as a solid layer formed by a traditional printing process or a molding process, a mold, a footwear last, etc.). For example, as shown in FIGS. 2C and 2D, second solid material 206 may be formed by depositing first liquid 201 onto portion 203 of second liquid 202 that is disposed on solid material 204.

In some embodiments, it may be advantageous to form a solid material (e.g., a solid layer) on the platform or on an object disposed on the platform because the thickness of the second liquid above the platform or object disposed on the platform may provide an upper limit on the thickness of the solid material or layer formed. For example, if the solid material or layer only forms when a first liquid contacts a second liquid, the volume and thickness over which the first and second liquid contact provide the maximum volume and thickness of features that may be formed. In some cases, the thickness of a solid material (e.g., a layer or portion thereof) formed by a method described herein may be determined by the thickness of the portion of the second liquid above the platform or object disposed on the platform (e.g., the thickness of the solid material may be roughly equivalent to the thickness of the portion of the second liquid above the platform or object disposed on the platform). This may allow for the formation of solid materials (e.g., solid layers or portions thereof) with uniform thicknesses, with advantageously small thicknesses, and/or with uniform advantageously small thicknesses. It may also allow for the formation of solid materials (e.g., solid layers or portions thereof) with different thicknesses, but for which the relative thicknesses with respect to each other may be controlled in an advantageous manner. For example, a layer with fine features may be printed in a thin portion of a second liquid extending above a layer with coarse features that was printed in a thick portion of the second liquid. This may allow for relatively rapid formation of thick layers for which fine detail is relatively less important and relatively slow formation of thin layers for which fine detail is important in a single system and for a single final 3D-printed article. In some cases, final 3D-printed articles that would be otherwise be formed using at least two different systems and/or at least two different processes may be fabricated in a more rapid and streamlined manner on a single system by employing one or more of the methods described herein.

Certain embodiments relate to systems that have one or more advantageous properties. For example, certain embodiments of systems may be able to carry out one or more of the methods described herein. As another example, a system may be configured to 3D-print one or more materials rapidly and/or facilely, and/or may be configured to 3D-print materials that would be challenging or impossible to print on other systems. It should be understood that the methods may also be performed on other systems, and that the systems described herein may be used to perform other methods.

Figure 3:
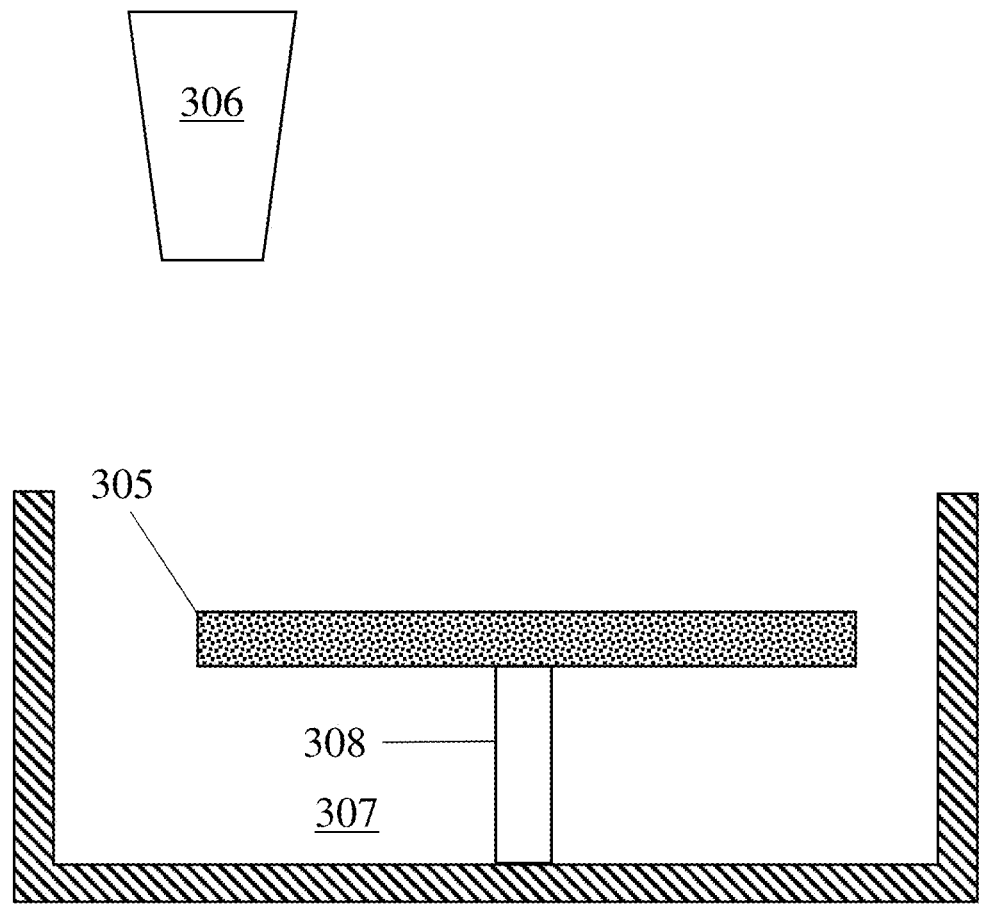
FIG. 3 depicts a system for forming solid materials, according to certain embodiments.

FIG. 3 shows one exemplary embodiment of a system comprising nozzle 306, vessel 307, and platform 305. The system may also, in some but not necessarily all embodiments, comprise a component 308 that connects the platform to the vessel. In some embodiments, the nozzle may be configured to expel a liquid, such as a first liquid described herein. In some embodiments, the vessel may be configured to contain a liquid, such as a second liquid described herein. The vessel may be substantially free of leaks with respect to the second liquid in some cases. As used herein, a vessel is considered to be substantially free of leaks with respect to a liquid if, when the vessel is filled with the liquid such that 50% of the volume of the vessel is occupied by the liquid, the vessel holds the liquid for 24 hours without more than 5 wt % of the liquid leaking through the walls and out of the vessel. In some cases, the vessel that is substantially free of leaks with respect to the liquid—when the vessel is filled with the liquid such that 50% of the volume of the vessel is occupied by the liquid—will hold the liquid for 24 hours without more than 1 wt %, more than 0.1 wt %, more than 0.01 wt %, or more than 0.001 wt % of the liquid leaking through the walls and out of the vessel. Those of ordinary skill in the art would understand that liquid that volatilizes and exits the vessel in the form of a gas or vapor is not a liquid that leaks through the walls and out of the vessel.

In some embodiments, a system may comprise a nozzle and a platform that are configured such that the first liquid expelled by the nozzle is directed toward the platform. Systems with this design may be configured to carry out a method in which a nozzle is used to deposit a first liquid onto a portion of a second liquid contained within the vessel.

In some cases, one or more components of a system described herein may be configured to be translated (i.e., spatially moved relative to at least one other component of the system). For instance, a system may comprise a nozzle that may be translated with respect to a platform within the system and/or translated with respect to a vessel within the system. In some cases, a system may comprise a platform that is configured to be translated. For example, the platform may be configured to be translated through at least a portion of the depth of a vessel in which it is positioned. As another example, the platform may be configured to be translated laterally within a vessel in which it is positioned and/or configured to be rotated around one or more axes. In some cases, the platform may be configured to be translated through and/or within a vessel comprising a fluid, such as a second liquid as described herein. Such platforms may have one or more features that facilitate translation through a fluid, as will be described in further detail below.

As described above, certain embodiments relate to methods for forming solid materials (e.g., final 3D-printed articles) that include successively forming a series of solid layers disposed on top of one another. This may be accomplished by repeating one or more of the method steps described herein, and/or by performing one or more further steps as described below. For example, a method may comprise lowering a platform on which a first solid material (e.g., a first solid layer) is formed during a prior step. The platform may be submerged deeper in the second liquid, in some cases to a depth such that at least a portion of the second liquid is positioned over the platform. Then, an additional solid material (e.g., an additional solid layer) may be 3D-printed onto the previously-formed solid material. For example, a method may comprise depositing the first liquid onto the portion of the second liquid that is positioned over the platform to form a second solid layer on the first solid layer. As another example, a method may comprise depositing a third liquid comprising a third molecule with a third functional group onto the portion of the second liquid that is positioned over the platform to form a second solid layer on the first solid layer. The third liquid may be identical to the first liquid, or may differ from the first liquid. In some cases, the third molecule and/or third functional group may be different from the first molecule and/or first functional group. This may result in the formation of a second layer with a different composition than the first layer. It should be noted that a variety of suitable mechanisms may be employed to lower the platform when desired, such as a screw, a linear actuator, a belt, a rack and pinion, an piezoelectric actuator, an air piston, and/or a hydraulic system.

In some embodiments, the platform is lowered a distance such that the portion of the second liquid above the platform has a desirable thickness. For example, the platform may be lowered by an amount that results in the portion of the second liquid above the platform has a thickness that allows solid materials (e.g., solid layers) of a desirable thickness to be formed on the platform, and/or to be formed on a solid material (e.g., a solid layer) disposed on the platform. In some embodiments, the platform is lowered by a distance of less than or equal to 200 microns, less than or equal to 100 microns, less than or equal to 50 microns, less than or equal to 20 microns, less than or equal to 10 microns, less than or equal to 5 microns, or less than or equal to 2 microns after forming a first solid material on the platform (e.g., a first solid layer) and prior to forming a second solid material (e.g., a second solid layer) on the first solid material. In some embodiments, the platform is lowered by a distance of greater than or equal to 1 micron, greater than or equal to 2 microns, greater than or equal to 5 microns, greater than or equal to 10 microns, greater than or equal to 20 microns, greater than or equal to 50 microns, or greater than or equal to 100 microns after forming a first solid material on the platform (e.g., a first solid layer) and prior to forming a second solid material (e.g., a second solid layer) on the first solid material. Combinations of the above-referenced ranges are also possible (e.g., greater than or equal to 1 micron and less than or equal to 200 microns). Other ranges are also possible. In some embodiments, the platform may be lowered and then raised (e.g., both the lowering and raising steps may be performed prior to depositing a first liquid onto a portion of a second liquid that is positioned over the platform to form a second solid layer on a first solid layer). References to distances herein should be understood to refer to either one of an actual distance the platform is lowered (i.e., the distance travelled by the platform during the lowering step prior to any raising step) or to a net distance travelled by the platform between a two sequential steps of forming a solid material or layer on the platform (e.g., to the net distance travelled by the platform between a step of depositing a first liquid onto the platform to form a first solid layer and a second step of depositing a first liquid onto the first solid layer).

It should be understood that certain methods may comprise more than one step in which the platform is lowered. In such methods, the platform may be lowered by different distances in different steps. For example, the platform may be lowered by a first distance prior to deposition of a first solid material (e.g., a first solid layer), and then lowered by a second distance prior to deposition of a second solid material (e.g., a second solid layer) onto the first solid material. In such cases, the second distance may be equal to the first distance, greater than the first distance, or less than the first distance.

In some embodiments, a method may comprise performing one or more supplemental steps. Supplemental steps may be performed prior to, simultaneously with, and/or after depositing a first liquid onto a portion of a second liquid. One example of a supplemental step is depositing one or more additional materials onto a solid material (such as a solid material (e.g., a solid layer) formed by depositing a first liquid onto a portion of a second liquid). The additional material(s) may be deposited by a 3D-printing technique, and/or by a non 3D-printing technique. Non-limiting examples of suitable techniques include direct ink writing (DIW), stereolithography (SL), fused deposition modeling (FDM), laser sintering, laminated object manufacturing (LOM), material jetting, ink jet printing, aerosol jet printing, drop on demand printing, pick and place of components printing, and combinations thereof.

In some embodiments, a method comprises performing a process to aid mixing between a second liquid and a liquid deposited thereon, such as a first liquid and/or a third liquid. Some systems comprise a component configured to aid mixing (and/or capable of aiding mixing) between a second liquid and a liquid deposited thereon. The mixing may occur over a limited a volume. In some embodiments, the mixing may comprise penetration of the second liquid into a liquid deposited thereon without substantially altering the spatial extent of the liquid deposited thereon. Without wishing to be bound by any particular theory, it is believed that these types of processes may be especially beneficial when the second liquid and the liquid deposited thereon are not miscible. In such cases, insufficient mixing between the second liquid and the liquid deposited thereon may result in the formation of a structure in which the second liquid is separated from the liquid deposited thereon by a thin shell comprising a reaction product of a second molecule in the second liquid and a molecule in the liquid deposited thereon. For applications in which it is desirable for the reaction product to form throughout the volume of the liquid deposited on the second liquid, instead of only at the interface between the second liquid and the liquid deposited thereon, this insufficient mixing may be undesirable.

A variety of strategies may be employed to aid mixing between a second liquid and a liquid deposited thereon. In some embodiments, mixing is aided by application of vibrations, such as ultrasonic vibrations, to the second liquid. The vibrations may be provided by, for instance, a transducer coupled to a signal generator. The signal generator may supply a signal to the transducer that indicates features of the vibrations to be provided (e.g., frequency, amplitude, total time) and the transducer may vibrate in accordance with the signal provided. In some embodiments, the signal generator is an ultrasonic signal generator (in other words, a signal generator that provides an ultrasonic signal). Non-limiting examples of signal generators include self-excitation generators and separate-excitation generators. One example of a suitable transducer is an ultrasonic horn.

When employed, the vibrations (e.g., ultrasonic vibrations) may be applied in a variety of suitable locations, such as at the surface of the second liquid, below the surface of the second liquid, and/or above the surface of the second liquid. The component or components utilized to provide the vibrations may also be positioned at a variety of suitable locations. These may include locations at the surface of the second liquid, below the surface of the second liquid, and/or above the surface of the second liquid. In some embodiments, the component or components utilized to provide the vibrations are at least partially submerged beneath a surface of the second liquid. When the system comprises a platform, the component or components utilized to provide the vibrations may be positioned below the platform, above the platform, to the side of the platform, and/or touching the platform. In some embodiments, a system may comprise two or more components to provide the vibrations, and these components may be positioned in different locations from each other (e.g., one may be positioned to one side of the platform, and another may be positioned beneath the platform).

When vibrations are employed, the vibrations may have a variety of suitable frequencies. The frequencies may be ultrasonic frequencies (i.e., in the case of ultrasonic vibrations), acoustic frequencies, or other frequencies. The vibrations may be provided at a frequency of greater than or equal to 5 kHz, greater than or equal to 10 kHz, greater than or equal to 15 kHz, greater than or equal to 20 kHz, greater than or equal to 50 kHz, greater than or equal to 100 kHz, or greater than or equal to 150 kHz. The vibrations may be provided at a frequency of less than or equal to 200 kHz, less than or equal to 100 kHz, less than or equal to 50 kHz, less than or equal to 20 kHz, less than or equal to 15 kHz, or less than or equal to 10 kHz. Combinations of the above-referenced ranges are also possible (e.g., greater than or equal to 5 kHz and less than or equal to 200 kHz, or greater than or equal to 15 kHz and less than or equal to 100 kHz). Other ranges are also possible.

When vibrations, such as ultrasonic vibrations, are employed, they may be employed for a variety of suitable times. In some embodiments, the vibrations may be provided continuously. By way of example, the vibrations may be turned on and then continuously applied throughout an entire 3D-printing process. As another example, the vibrations may be turned on and applied for a single discrete portion of a 3D-printing process. As a third example, the vibrations may be manually turned on and off as desired, and may remain in the on and off states indefinitely absent being switched therebetween. In some embodiments, the vibrations are provided on a duty cycle. In other words, the vibrations are applied on a cycle in which they are switched on and off at set points in time. Some duty cycles have off times and on times of comparable lengths. The vibrations may be switched on and off based on a trigger due to time elapsed since the previous switch, and/or based on a trigger due to a state of the system. For instance, the vibrations may be switched on after deposition of a first liquid onto a second liquid, and may be switched off after a platform is lowered. The vibrations may be applied prior to deposition of a liquid onto a second liquid, during deposition of a liquid onto a second liquid, after deposition of a liquid onto a second liquid, while the platform is being translated, while the nozzle is being translated, and the like.

In some cases, an additional material may be deposited that is configured to provide one or more advantageous features when present in a final 3D-printed article, such as cells, pigments, and polyols. Non-limiting examples of suitable cell types include stem cells, muscle cells, and bone cells. Different types of cells may be deposited in different locations within a single solid material (e.g., within a single solid layer, in different solid layers within a single solid material). In some embodiments, the pigment may be in the form of a concentrated suspension in a solvent and/or a short chain diol.

In some cases, an additional material may be deposited that is configured to facilitate the formation of one or more voids in a final 3D-printed article. For example, a foaming agent (e.g., water, a surfactant, a combination of water with a surfactant) may be deposited. As another example, an additional material that may be subsequently removed from the article may be deposited. In some embodiments, the additional material may be configured to be mechanically detached from the platform and/or from the solid material. Other examples include materials that are configured to undergo phase transitions, such as poly(ethylene oxide)-poly (propylene oxide) copolymers, and materials that are soluble in common solvents, such as water. In some cases, an additional material may be configured to undergo a phase transition at a temperature of greater than or equal to −20° C., greater than or equal to −10° C., greater than or equal to 0° C., greater than or equal to 10° C., greater than or equal to 20° C., or greater than or equal to 30° C., greater than or equal to 40° C. In some cases, the additional material may be configured to undergo a phase transition at a temperature of less than or equal to 50° C., less than or equal to 40° C., less than or equal to 30° C., less than or equal to 20° C., less than or equal to 10° C., less than or equal to 0° C., or less than or equal to −10° C. Combinations of the above-referenced ranges are also possible (e.g., greater than or equal to −20° C. and less than or equal to 50° C.). Other ranges are also possible.

In some cases, it may be advantageous to deposit one or more additional materials described herein (e.g., cells, pigments, polyols, foaming agents, and/or materials configured to facilitate the formation of voids) prior to depositing the first liquid onto the portion of the second liquid. In some cases, it may be advantageous to deposit foaming agents and/or other materials configured to facilitate the formation of voids in between a first step of depositing the first liquid onto the portion of the second liquid and a second step of depositing a liquid (e.g., the first liquid, a third liquid) onto the second liquid. The liquid deposited onto the second liquid (e.g., the first liquid, the third liquid) may react with the second liquid above and/or around the additional materials, and/or may encapsulate the additional materials within a resultant solid material (e.g., a solid layer, and/or a final 3D-printed article).

Another example of a supplemental step is removing a solid material (e.g., a solid layer and/or a final 3D-printed article) from a system that was employed to manufacture it. For example, certain inventive methods comprise removing a solid material (e.g., a solid layer and/or a final 3D-printed article) from a platform on which it is disposed. Certain inventive methods comprise removing a solid material (e.g., a solid layer and/or a final 3D-printed article) from a liquid (e.g., a second liquid) by which it is at least partially surrounded and/or in which it is at least partially submerged. Certain inventive methods comprise removing a solid material (e.g., a solid layer and/or a final 3D-printed article) from a vessel in which it is at least partially enclosed. Combinations of two or more (or all) of such steps are also possible. Other examples of a supplemental steps include curing any latent curing agents that may be present within the solid material, solid layer, and/or final 3D-printed article; and dissolving any dissolvable material or portion thereof that may be present within the solid material, solid layer, and/or final 3D-printed article. In some embodiments, a latent curing may initially be present in the first liquid or second liquid and may be incorporated into the solid material, solid layer, and/or final 3D-printed article in an uncured form. The solid material, solid layer, and/or final 3D-printed article may be removed from the vessel and then exposed to a stimulus that results in the curing of the latent curing agent, such as light and/or heat. Curing the latent curing agent may increase the strength of the final 3D-printed article, may increase the density of the final 3D-printed article, and/or may improve the surface finish of the final 3D-printed article. The latent curing agent may be a blocked isocyanate such as blocked toluene diisocyanate.

A further example of a supplemental step is a resting step (i.e., a step where no action is taken). Resting steps may be taken prior to, after, and/or between any two steps described herein. In some embodiments, resting steps may be taken sequentially. Resting steps may last for any suitable amount of time. In some embodiments, a method may comprise a resting step that lasts for a period of time of greater than or equal to 0.1 second, greater than or equal to 0.2 seconds, greater than or equal to 0.5 seconds, greater than or equal to 1 second, greater than or equal to 2 seconds, greater than or equal to 5 seconds, greater than or equal to 10 seconds, greater than or equal to 30 seconds, or greater than or equal to 45 seconds. In some embodiments, a method may comprise a resting step that lasts for a period of time of less than or equal to 1 minute, less than or equal to 45 seconds, less than or equal to 30 seconds, less than or equal to 10 seconds, less than or equal to 5 seconds, less than or equal to 2 seconds, less than or equal to 1 second, less than or equal to 0.5 seconds, or less than or equal to 0.2 seconds. Combinations of the above-referenced ranges are also possible (e.g., greater than or equal to 0.1 second and less than or equal to 1 minute). Other ranges are also possible.

As described above, certain embodiments relate to forming solid materials and/or solid layers by reacting first functional groups of first molecules with second functional groups of second molecules. In some embodiments, reacting the first functional group with the second functional group comprises forming a polymer. For example, reacting the first functional group with the second functional group may comprise polymerizing one or both of the first molecule and the second molecule. In some embodiments, the reaction may be a polymerization reaction. Polymerization reactions may be step growth reactions, such as click reactions, and/or chain growth reactions, such as free radical polymerization reactions. In some embodiments, reacting the first functional group with the second functional group comprises catalyzing a reaction of one or both of the first molecule and the second molecule. In some but not all cases the reaction catalyzed may be a polymerization reaction. In certain embodiments, a reaction between a first functional group and a second functional group may be a precipitation reaction. For instance, reacting the first functional group with the second functional group may comprise precipitating one or both of the first molecule and the second molecule. In some embodiments, a reaction between a first functional group and a second functional group may be a cross-linking reaction. The cross-linking reaction may result in the precipitation of a cross-linked species from the first liquid and/or the second liquid.

In some embodiments, a solid material or solid layer may be formed by a reaction of the first molecule with the second molecule. In other words, the solid material or solid layer may comprise a reaction product of the first molecule and the second molecule. In certain cases, the reaction product may include at least a portion of the first molecule and at least a portion of the second molecule. In other cases, the reaction product, the solid material, and/or the solid layer may be substantially free from the first molecule or the second molecule. In some embodiments, the reaction product may be insoluble in the second liquid. In certain embodiments, such as when reacting the first functional group with the second functional group comprises forming a polymer and/or cross-linking a polymer, the reaction product may be a polymer. The polymer may be a thermoplastic polymer, or may be a thermoset polymer. In some embodiments, the polymer may be a polyurethane, a polyurea, a polyurethane/polyurea hybrid formulation (i.e., a polymer comprising both urethane and urea functional groups), a cured epoxy resin, a silicone polymer, an acrylate polymer, a methacrylate polymer, an alginate polymer, and/or a cross-linked polymer such as cross-linked collagen.

In embodiments in which a solid material or layer is formed by reacting a first functional group with a second functional group, a variety of suitable first and/or second functional groups can be employed. Non-limiting examples of functional groups that can be used as the first and/or second functional groups include isocyanate groups such as methylene diphenyl diisocyanate groups, alcohol groups, amine groups, carboxyl groups, carboxylate groups, amide groups, acetate groups, epoxy groups, catalysts such as platinum catalysts, silicone hydride groups, vinyl groups, acrylate groups, methacrylate groups, peroxide groups, acid groups such as carboxylic acid groups, base groups, alginate groups, ions such as multivalent ions, collagen, cross-linking groups, and/or fibrin groups. It should be understood that these groups may be used in any suitable combination, and that other functional groups and other combinations of first and second functional groups are also contemplated. It should also be understood that a first molecule and/or a second molecule may comprise more than one first functional group or second functional group. For example, a first molecule may comprise two or more isocyanate groups and/or a second molecule may comprise two or more alcohol groups and/or two or more amine groups (e.g., the second molecule may be a polyol and/or a polyamine). In some embodiments, a first molecule and/or a second molecule may comprise further functional groups (e.g., a first molecule may comprise a first functional group and a third functional group, a second molecule may comprise a second functional group and a fourth functional group). In some cases, the first molecule may comprise a catalyst that catalyzes a reaction between two different types of functional groups on the second molecule (e.g., the second functional group and a third functional group also on the second molecule) and/or that catalyzes a reaction between the second functional group and a third functional group on a third molecule present in either the first liquid or the second liquid.

Exemplary combinations of first and second functional groups include first functional groups that are isocyanate groups and second functional groups that are polyol groups (or vice versa) that may react to form polyurethanes; first functional groups that are isocyanate groups and second functional groups that are amine groups (or vice versa) that may react to form polyureas; first functional groups that are amine groups and second functional groups that are epoxy groups (or vice versa) that may react to form cured epoxy resins; first functional groups that are acid groups or base groups and second functional groups that are epoxy groups (or vice versa) that may react to form cured epoxy resins; first functional groups that are platinum catalysts, second functional groups that are vinyl groups, and third functional groups that are silicone hydride groups (or vice versa) that may react to form cured silicone rubbers; first functional groups that are peroxide groups and second functional groups that are methacrylate groups or acrylate groups (or vice versa) that may react to form poly(acrylate)s or poly(methacrylate)s, respectively; first functional groups that are divalent ions and second functional groups that are alginate groups (or vice versa) that may react to form alginate polymers; and first functional groups that are collagen cross-linking groups such as fibrin and second functional groups that are collagen (or vice versa) that may react to form cross-linked collagen.

As described above, a reaction product may include a polyurethane. The polyurethane may be formed by reacting a first functional group that is one of a polyol or an isocyanate with a second functional group that is the other. The polyol may be any suitable polyhydroxy compound. For example, the polyol may be a hydroxy-terminated ester, ether or carbonate diol. Non-limiting examples of polyalkylene ether glycols include polyethylene ether glycols, poly-1,2-propylene ether glycols, polytetramethylene ether glycols, poly-1,2-dimethylethylene ether glycols, poly-1,2-butylene ether glycol, and polydecamethylene ether glycols. In some embodiments, the polyol may be a polyalkylene ether glycol with a molecular weight between 200 and 10,000 Da. Examples of polyester polyols include polybutylene adipate and polyethylene terephthalate. Examples of polycarbonate diols include polytetramethylene carbonate diol, polypentamethylene carbonate diol, polyhexamethylene carbonate diol, polyhexane-1,6-carbonate diol and poly(1,6-hexyl-1,2-ethyl carbonate)diol. However, many other suitable polyhydroxy compounds can also be used depending upon the desired application. Any suitable polyol, polythiol or polyamine or mixture thereof that is suitable for this purpose may be used, such as, for example, mixed diols comprising a 2,4-dialkyl-1,5-pentanediol and a 2,2-dialkyl-1,3-propanediol. Specific examples of 2,4-dialkyl-1,5-pentanediols include 2,4-dimethyl-1,5-pentanediol, 2-ethyl-4-methyl-1,5-pentanediol, 2-methyl-4-propyl-1,5-pentanediol, 2,4-diethyl-1,5-pentanediol, 2-ethyl-4-propyl-1,5-pentanediol, 2,4-dipropyl-1,5-pentanediol, 2-isoptopyl-4-methyl-1,5-pentanediol, 2-ethyl-4-isoptopyl-1,5-pentanediol, 2,4-diisopropyl-1,5-pentanediol, 2-isopropyl-4-propyl-1,5-pentanediol, 2,4-dibutyl-1,5-pentanediol, 2,4-dipentyl-1,5-pentanediol, 2,4-dihexyl-1,5-pentanediol, and the like. Specific examples of 2,2-dialkyl-1,3-propanediols include 2,2-dipentyl-1,3-propanediol, 2,2-dihexyl-1,3-propanediol and the like.

Polyols may comprise any number of hydroxyl groups (e.g., one, two, three, or more). In some embodiments, a composition may comprise a mixture of polyols with differing functionalities. For example, the composition may comprise a mixture of diols and triols. In some embodiments, the triols may comprise polyether triols.

In some cases, longer-chain or higher molecular weight polyols may be used to produce relatively softer materials because they have more polyol relative to isocyanate. In some embodiments, the polyols may have a number average molecular weight of greater than or equal to 200 Da, greater than or equal to 500 Da, greater than or equal to 1,000 Da, greater than or equal to 2,000 Da, or greater than or equal to 5,000 Da. In some embodiments, the polyols may have a number average molecular weight of less than or equal to 10,000 Da, less than or equal to 5,000 Da, less than or equal to 2,000 Da, less than or equal to 1,000 Da, or less than or equal to 500 Da. Combinations of the above-referenced ranges are also possible (e.g., greater than or equal to 200 Da and less than or equal to 10,000 Da). Other ranges are also possible. The number average molecular weight of the polyols may be determined by gel permeation chromatography.

In some cases, the isocyanate can be underindexed compared to the number of reactive sites on the polyol to make a softer foam that behaves less elastically.

The cross-linking agent, if present, can comprise an isocyanate in some cases, and/or an isocyanate prepolymer. An isocyanate may have more than one functional isocyanate group per molecule and may be any suitable aromatic, aliphatic or cycloaliphatic polyisocyanate. In some cases, the isocyanate is a diisocyanate. One non-limiting example is an organic diisocyanate. Additional examples of organic diisocyanates include 4,4'-diisocyanatodiphenylmethane, 2,4'-diisocyanatodiphenylmethane, isophorone diisocyanate, p-phenylene diisocyanate, 2,6-toluene diisocyanate, polyphenyl polymethylene polyisocyanate, 1,3-bis(isocyanatomethyl) cyclohexane, 1,4-diisocyanatocyclohexane, 1,6-hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, and 2,4-toluene diisocyanate, or combinations thereof.

In some cases, an isocyanate prepolymer may be used, e.g., in addition to and/or instead of an isocyanate. For instance, where two isocyanates are added to the ends of a polyol, so it still has functionality of two, but with a higher molecular weight.

In some embodiments, a crosslinked polyurethane is (i.e., a thermoset) is formed as the reaction product. In some embodiments, a thermoplastic is formed as the reaction product. As a non-limiting example, a high number average molecular weight diol may be mixed with an isocyanate (e.g., a diisocyanate, or other isocyanates described herein) and deposited onto a substrate, e.g., to produce a thermoplastic elastomer. In another embodiment, a low number-average molecular weight diol can be mixed with an isocyanate and deposited onto a substrate, e.g., to produce a rigid thermoplastic. In yet another embodiment, a high number-average molecular weight diol and a high number-average molecular weight triol can be mixed, and then the polyol mixture mixed with an isocyanate and deposited onto a substrate, e.g., to produce a flexible thermosetting elastomer with high resiliency.

In some embodiments, the solid material or solid layer may comprise one or more further species in addition to a reaction product of a first molecule and the second molecule, such as water, a latent curing agent (e.g., a latent curing agent configured to be activated by exposure to light and/or heat), an unreacted first molecule and/or second molecule, a catalyst (e.g., a catalyst that promotes the formation of a polyurethane or polyurea, such as amine catalyst or an organometallic catalyst like a bismuth organometallic catalyst), a stabilizer, an antioxidant, a UV absorber, a filler particle, a foaming agent, a surfactant, and/or a thinner. For example, the solid material and/or layer may comprise water and be a hydrogel. In some embodiments, water may make up greater than or equal to 0.001 wt %, greater than or equal to 0.002 wt %, greater than or equal to 0.005 wt %, greater than or equal to 0.01 wt %, greater than or equal to 0.02 wt %, greater than or equal to 0.05 wt %, greater than or equal to 0.1 wt %, greater than or equal to 0.2 wt %, greater than or equal to 0.5 wt %, greater than or equal to 1 wt %, greater than or equal to 2 wt %, greater than or equal to 5 wt %, greater than or equal to 10 wt %, greater than or equal to 20 wt %, greater than or equal to 50 wt %, greater than or equal to 75 wt %, greater than or equal to 90 wt %, greater than or equal to 95 wt %, greater than or equal to 97.5 wt %, or greater than or equal to 99 wt % of the solid material and/or solid layer. In some embodiments, water may make up less than or equal to 99.5 wt %, less than or equal to 99 wt %, less than or equal to 97.5 wt %, less than or equal to 95 wt %, less than or equal to 90 wt %, less than or equal to 75 wt %, less than or equal to 50 wt %, less than or equal to 20 wt %, less than or equal to 10 wt %, less than or equal to 5 wt %, less than or equal to 2 wt %, less than or equal to 1 wt %, less than or equal to 0.5 wt %, less than or equal to 0.2 wt %, less than or equal to 0.1 wt %, less than or equal to 0.05 wt %, or less than or equal to 0.02 wt % of the solid material and/or solid layer. Combinations of the above-referenced ranges are also possible (e.g., greater than or equal to 0.001 wt % water and less than or equal to 99.5 wt % water). Other ranges are also possible.

When a first molecule is present in a first liquid, it may be present in a variety of suitable forms within the first liquid. As an example, the first molecule may make up essentially all of the first liquid. As another example, the first molecule may be dissolved in a solvent also present in the first liquid. As a third example, the first molecule may be suspended as a particulate solid in the first liquid. The first molecule may make up a variety of suitable weight percentages (expressed herein as "wt %") of the first liquid. In some embodiments, the first molecule may make up greater than or equal to 0.00001 wt % of the first liquid, greater than or equal to 0.00002 wt % of the first liquid, greater than or equal to 0.00005 wt % of the first liquid, greater than or equal to 0.0001 wt % of the first liquid, greater than or equal to 0.0002 wt % of the first liquid, greater than or equal to 0.0005 wt % of the first liquid, greater than or equal to 0.001 wt % of the first liquid, greater than or equal to 0.002 wt % of the first liquid, greater than or equal to 0.005 wt % of the first liquid, greater than or equal to 0.01 wt % of the first liquid, greater than or equal to 0.02 wt % of the first liquid, greater than or equal to 0.05 wt % of the first liquid, greater than or equal to 0.1 wt % of the first liquid, greater than or equal to 0.2 wt % of the first liquid, greater than or equal to 0.5 wt % of the first liquid, greater than or equal to 1 wt % of the first liquid, greater than or equal to 2 wt % of the first liquid, greater than or equal to 5 wt % of the first liquid, greater than or equal to 10 wt % of the first liquid, greater than or equal to 20 wt % of the first liquid, greater than or equal to 50 wt % of the first liquid, greater than or equal to 75 wt % of the first liquid, greater than or equal to 90 wt % of the first liquid, greater than or equal to 95 wt % of the first liquid, greater than or equal to 97.5 wt % of the first liquid, greater than or equal to 99 wt % of the first liquid, greater than or equal to 99.9 wt % of the first liquid, or greater than or equal to 99.99 wt % of the first liquid. In some embodiments, the first molecule may make up less than or equal to 99.999 wt % of the first liquid, less than or equal to 99.99 wt % of the first liquid, less than or equal to 99.9 wt % of the first liquid, less than or equal to 99 wt % of the first liquid, less than or equal to 97.5 wt % of the first liquid, less than or equal to 95 wt % of the first liquid, less than or equal to 90 wt % of the first liquid, less than or equal to 75 wt % of the first liquid, less than or equal to 50 wt % of the first liquid, less than or equal to 20 wt % of the first liquid, less than or equal to 10 wt % of the first liquid, less than or equal to 5 wt % of the first liquid, less than or equal to 2 wt % of the first liquid, less than or equal to 1 wt % of the first liquid, less than or equal to 0.5 wt % of the first liquid, less than or equal to 0.2 wt % of the first liquid, less than or equal to 0.1 wt % of the first liquid, less than or equal to 0.05 wt % of the first liquid, less than or equal to 0.02 wt % of the first liquid, less than or equal to 0.01 wt % of the first liquid, less than or equal to 0.005 wt % of the first liquid, less than or equal to 0.002 wt % of the first liquid, less than or equal to 0.001 wt % of the first liquid, less than or equal to 0.0005 wt % of the first liquid, less than or equal to 0.0002 wt % of the first liquid, less than or equal to 0.0001 wt % of the first liquid, less than or equal to 0.00005 wt % of the first liquid, or less than or equal to 0.00002 wt % of the first liquid. Combinations of the above-referenced ranges are also possible (e.g., greater than or equal to 0.00001 wt % of the first liquid and less than or equal to 99.999 wt % of the first liquid). Other ranges are also possible. The wt % of the first molecule in the first liquid may be calculated by dividing the weight of the first molecule in the first liquid by the total weight of the first liquid. The total weight of the first liquid should be understood to include the first molecule, any solvents within the first liquid, and any further species dissolved or suspended in the first liquid.

In some embodiments, a first liquid as described herein may comprise water. Water may make up greater than or equal to 0.00001 wt % of the first liquid, greater than or equal to 0.00002 wt % of the first liquid, greater than or equal to 0.00005 wt % of the first liquid, greater than or equal to 0.0001 wt % of the first liquid, greater than or equal to 0.0002 wt % of the first liquid, greater than or equal to 0.0005 wt % of the first liquid, greater than or equal to 0.001 wt % of the first liquid, greater than or equal to 0.002 wt % of the first liquid, greater than or equal to 0.005 wt % of the first liquid, greater than or equal to 0.01 wt % of the first liquid, greater than or equal to 0.02 wt % of the first liquid, greater than or equal to 0.05 wt % of the first liquid, greater than or equal to 0.1 wt % of the first liquid, greater than or equal to 0.2 wt % of the first liquid, greater than or equal to 0.5 wt % of the first liquid, greater than or equal to 1 wt % of the first liquid, greater than or equal to 2 wt % of the first liquid, greater than or equal to 5 wt % of the first liquid, greater than or equal to 10 wt % of the first liquid, greater than or equal to 20 wt % of the first liquid, greater than or equal to 50 wt % of the first liquid, greater than or equal to 75 wt % of the first liquid, greater than or equal to 90 wt % of the first liquid, greater than or equal to 95 wt % of the first liquid, greater than or equal to 97.5 wt % of the first liquid, greater than or equal to 99 wt % of the first liquid, greater than or equal to 99.9 wt % of the first liquid, or greater than or equal to 99.99 wt % of the first liquid. In some embodiments, water may make up less than or equal to 99.999 wt % of the first liquid, less than or equal to 99.99 wt % of the first liquid, less than or equal to 99.9 wt % of the first liquid, less than or equal to 99 wt % of the first liquid, less than or equal to 97.5 wt % of the first liquid, less than or equal to 95 wt % of the first liquid, less than or equal to 90 wt % of the first liquid, less than or equal to 75 wt % of the first liquid, less than or equal to 50 wt % of the first liquid, less than or equal to 20 wt % of the first liquid, less than or equal to 10 wt % of the first liquid, less than or equal to 5 wt % of the first liquid, less than or equal to 2 wt % of the first liquid, less than or equal to 1 wt % of the first liquid, less than or equal to 0.5 wt % of the first liquid, less than or equal to 0.2 wt % of the first liquid, less than or equal to 0.1 wt % of the first liquid, less than or equal to 0.05 wt % of the first liquid, less than or equal to 0.02 wt % of the first liquid, less than or equal to 0.01 wt % of the first liquid, less than or equal to 0.005 wt % of the first liquid, less than or equal to 0.002 wt % of the first liquid, less than or equal to 0.001 wt % of the first liquid, less than or equal to 0.0005 wt % of the first liquid, less than or equal to 0.0002 wt % of the first liquid, less than or equal to 0.0001 wt % of the first liquid, less than or equal to 0.00005 wt % of the first liquid, or less than or equal to 0.00002 wt % of the first liquid. Combinations of the above-referenced ranges are also possible (e.g., greater than or equal to 0.00001 wt % of the first liquid and less than or equal to 99.999 wt % of the first liquid). Other ranges are also possible. The wt % of water in the first liquid may be calculated by dividing the weight of the water in the first liquid by the total weight of the first liquid. The total weight of the first liquid should be understood to include the first molecule, any solvents within the first liquid, and any further species dissolved or suspended in the first liquid.

In some embodiments, a first liquid as described herein may comprise one or more organic solvents. The organic solvent(s) may make up greater than or equal to 0.00001 wt % of the first liquid, greater than or equal to 0.00002 wt % of the first liquid, greater than or equal to 0.00005 wt % of the first liquid, greater than or equal to 0.0001 wt % of the first liquid, greater than or equal to 0.0002 wt % of the first liquid, greater than or equal to 0.0005 wt % of the first liquid, greater than or equal to 0.001 wt % of the first liquid, greater than or equal to 0.002 wt % of the first liquid, greater than or equal to 0.005 wt % of the first liquid, greater than or equal to 0.01 wt % of the first liquid, greater than or equal to 0.02 wt % of the first liquid, greater than or equal to 0.05 wt % of the first liquid, greater than or equal to 0.1 wt % of the first liquid, greater than or equal to 0.2 wt % of the first liquid, greater than or equal to 0.5 wt % of the first liquid, greater than or equal to 1 wt % of the first liquid, greater than or equal to 2 wt % of the first liquid, greater than or equal to 5 wt % of the first liquid, greater than or equal to 10 wt % of the first liquid, greater than or equal to 20 wt % of the first liquid, greater than or equal to 50 wt % of the first liquid, greater than or equal to 75 wt % of the first liquid, greater than or equal to 90 wt % of the first liquid, greater than or equal to 95 wt % of the first liquid, greater than or equal to 97.5 wt % of the first liquid, greater than or equal to 99 wt % of the first liquid, greater than or equal to 99.9 wt % of the first liquid, or greater than or equal to 99.99 wt % of the first liquid. In some embodiments, the organic solvent(s) may make up less than or equal to 99.999 wt % of the first liquid, less than or equal to 99.99 wt % of the first liquid, less than or equal to 99.9 wt % of the first liquid, less than or equal to 99 wt % of the first liquid, less than or equal to 97.5 wt % of the first liquid, less than or equal to 95 wt % of the first liquid, less than or equal to 90 wt % of the first liquid, less than or equal to 75 wt % of the first liquid, less than or equal to 50 wt % of the first liquid, less than or equal to 20 wt % of the first liquid, less than or equal to 10 wt % of the first liquid, less than or equal to 5 wt % of the first liquid, less than or equal to 2 wt % of the first liquid, less than or equal to 1 wt % of the first liquid, less than or equal to 0.5 wt % of the first liquid, less than or equal to 0.2 wt % of the first liquid, less than or equal to 0.1 wt % of the first liquid, less than or equal to 0.05 wt % of the first liquid, less than or equal to 0.02 wt % of the first liquid, less than or equal to 0.01 wt % of the first liquid, less than or equal to 0.005 wt % of the first liquid, less than or equal to 0.002 wt % of the first liquid, less than or equal to 0.001 wt % of the first liquid, less than or equal to 0.0005 wt % of the first liquid, less than or equal to 0.0002 wt % of the first liquid, less than or equal to 0.0001 wt % of the first liquid, less than or equal to 0.00005 wt % of the first liquid, or less than or equal to 0.00002 wt % of the first liquid. Combinations of the above-referenced ranges are also possible (e.g., greater than or equal to 0.00001 wt % of the first liquid and less than or equal to 99.999 wt % of the first liquid). Other ranges are also possible. The wt % of the organic solvent(s) in the first liquid may be calculated by dividing the weight of the organic solvent(s) in the first liquid by the total weight of the first liquid. The total weight of the first liquid should be understood to include the first molecule, any solvents within the first liquid, and any further species dissolved or suspended in the first liquid.

In some embodiments, a first liquid as described herein may further comprise one or more supplemental species. For example, the first liquid may comprise one or more of a pigment, a blowing agent (e.g., water), and a chain extender (e.g., butane diol, a short chain diamine).

A first liquid as described herein may have any suitable absolute viscosity at room temperature. In some embodiments, the absolute viscosity of the first liquid at room temperature may be greater than or equal to 1 cP, greater than or equal to 2 cP, greater than or equal to 5 cP, greater than or equal to 10 cP, greater than or equal to 15 cP, greater than or equal to 20 cP, greater than or equal to 25 cP, greater than or equal to 30 cP, greater than or equal to 50 cP, greater than or equal to 100 cP, greater than or equal to 200 cP, greater than or equal to 500 cP, greater than or equal to 1,000 cP, greater than or equal to 2,000 cP, greater than or equal to 5,000 cP, greater than or equal to 10,000 cP, greater than or equal to 20,000 cP, greater than or equal to 50,000 cP, greater than or equal to 100,000 cP, or greater than or equal to 200,000 cP. In some embodiments, the absolute viscosity of the first liquid at room temperature may be less than or equal to 500,000 cP, less than or equal to 200,000 cP, less than or equal to 100,000 cP, less than or equal to 50,000 cP, less than or equal to 20,000 cP, less than or equal to 10,000 cP, less than or equal to 5,000 cP, less than or equal to 2,000 cP, less than or equal to 1,000 cP, less than or equal to 500 cP, less than or equal to 200 cP, less than or equal to 100 cP, less than or equal to 50 cP, less than or equal to 30 cP, less than or equal to 25 cP, less than or equal to 20 cP, less than or equal to 15 cP, less than or equal to 10 cP, less than or equal to 5 cP, or less than or equal to 2 cP. Combinations of the above-referenced ranges are also possible (e.g., greater than or equal to 1 cP and less than or equal to 500,000 cP, or greater than or equal to 1 cP and less than or equal to 30 cP). Other ranges are also possible.

A first liquid as described herein may have any suitable absolute viscosity as it is being deposited. In other words, the first liquid may have any suitable absolute viscosity at a deposition temperature (i.e., a temperature of the first liquid as it is being deposited). In some embodiments, the absolute viscosity of the first liquid at the deposition temperature may be greater than or equal to 1 cP, greater than or equal to 2 cP, greater than or equal to 5 cP, greater than or equal to 10 cP, greater than or equal to 15 cP, greater than or equal to 20 cP, greater than or equal to 25 cP, greater than or equal to 30 cP, greater than or equal to 50 cP, greater than or equal to 100 cP, greater than or equal to 200 cP, greater than or equal to 500 cP, greater than or equal to 1,000 cP, greater than or equal to 2,000 cP, greater than or equal to 5,000 cP, greater than or equal to 10,000 cP, greater than or equal to 20,000 cP, greater than or equal to 50,000 cP, greater than or equal to 100,000 cP, or greater than or equal to 200,000 cP. In some embodiments, the absolute viscosity of the first liquid at the deposition temperature may be less than or equal to 500,000 cP, less than or equal to 200,000 cP, less than or equal to 100,000 cP, less than or equal to 50,000 cP, less than or equal to 20,000 cP, less than or equal to 10,000 cP, less than or equal to 5,000 cP, less than or equal to 2,000 cP, less than or equal to 1,000 cP, less than or equal to 500 cP, less than or equal to 200 cP, less than or equal to 100 cP, less than or equal to 50 cP, less than or equal to 30 cP, less than or equal to 25 cP, less than or equal to 20 cP, less than or equal to 15 cP, less than or equal to 10 cP, less than or equal to 5 cP, or less than or equal to 2 cP. Combinations of the above-referenced ranges are also possible (e.g., greater than or equal to 1 cP and less than or equal to 500,000 cP, or greater than or equal to 1 cP and less than or equal to 30 cP). Other ranges are also possible.

In some embodiments, a first liquid may comprise a prepolymer (e.g., an isocyanate prepolymer in embodiments in which the first functional group is an isocyanate). Prepolymers may increase the viscosity of the first liquid, and so the prepolymer content of the first liquid may be selected to provide a desired viscosity. Prepolymers may make up greater than or equal to 0.1 wt % of the first liquid, greater than or equal to 0.2 wt % of the first liquid, greater than or equal to 0.5 wt % of the first liquid, greater than or equal to 1 wt % of the first liquid, greater than or equal to 2 wt % of the first liquid, greater than or equal to 5 wt % of the first liquid, greater than or equal to 10 wt % of the first liquid, greater than or equal to 20 wt % of the first liquid, greater than or equal to 50 wt % of the first liquid, greater than or equal to 75 wt % of the first liquid, greater than or equal to 80 wt % of the first liquid, greater than or equal to 90 wt % of the first liquid, greater than or equal to 95 wt % of the first liquid, or greater than or equal to 97 wt % of the first liquid. Prepolymers may make up less than or equal to 99 wt % of the first liquid, less than or equal to 97 wt % of the first liquid, less than or equal to 95 wt % of the first liquid, less than or equal to 90 wt % of the first liquid, less than or equal to 80 wt % of the first liquid, less than or equal to 50 wt % of the first liquid, less than or equal to 20 wt % of the first liquid, less than or equal to 10 wt % of the first liquid, less than or equal to 5 wt % of the first liquid, less than or equal to 2 wt % of the first liquid, less than or equal to 1 wt % of the first liquid, less than or equal to 0.5 wt % of the first liquid, or less than or equal to 0.2 wt % of the first liquid. Combinations of the above-referenced ranges are also possible (e.g., greater than or equal to 0.1 wt % of the first liquid and less than or equal 99 wt % of the first liquid). Other ranges are also possible.

When a second molecule is present in a second liquid, it may be present in a variety of suitable forms within the second liquid. As an example, the second molecule may make up essentially all of the second liquid. As another example, the second molecule may be dissolved in a solvent also present in the second liquid. As a third example, the second molecule may be suspended as a particulate solid in the second liquid. The second molecule may make up a variety of suitable weight percentages of the second liquid. In some embodiments, the second molecule may make up greater than or equal to 0.00001 wt % of the second liquid, greater than or equal to 0.00002 wt % of the second liquid, greater than or equal to 0.00005 wt % of the second liquid, greater than or equal to 0.0001 wt % of the second liquid, greater than or equal to 0.0002 wt % of the second liquid, greater than or equal to 0.0005 wt % of the second liquid, greater than or equal to 0.001 wt % of the second liquid, greater than or equal to 0.002 wt % of the second liquid, greater than or equal to 0.005 wt % of the second liquid, greater than or equal to 0.01 wt % of the second liquid, greater than or equal to 0.02 wt % of the second liquid, greater than or equal to 0.05 wt % of the second liquid, greater than or equal to 0.1 wt % of the second liquid, greater than or equal to 0.2 wt % of the second liquid, greater than or equal to 0.5 wt % of the second liquid, greater than or equal to 1 wt % of the second liquid, greater than or equal to 2 wt % of the second liquid, greater than or equal to 5 wt % of the second liquid, greater than or equal to 10 wt % of the second liquid, greater than or equal to 20 wt % of the second liquid, greater than or equal to 50 wt % of the second liquid, greater than or equal to 75 wt % of the second liquid, greater than or equal to 90 wt % of the second liquid, greater than or equal to 95 wt % of the second liquid, greater than or equal to 97.5 wt % of the second liquid, greater than or equal to 99 wt % of the second liquid, greater than or equal to 99.9 wt % of the second liquid, or greater than or equal to 99.99 wt % of the second liquid. In some embodiments, the second molecule may make up less than or equal to 99.999 wt % of the second liquid, less than or equal to 99.99 wt % of the second liquid, less than or equal to 99.9 wt % of the second liquid, less than or equal to 99 wt % of the second liquid, less than or equal to 97.5 wt % of the second liquid, less than or equal to 95 wt % of the second liquid, less than or equal to 90 wt % of the second liquid, less than or equal to 75 wt % of the second liquid, less than or equal to 50 wt % of the second liquid, less than or equal to 20 wt % of the second liquid, less than or equal to 10 wt % of the second liquid, less than or equal to 5 wt % of the second liquid, less than or equal to 2 wt % of the second liquid, less than or equal to 1 wt % of the second liquid, less than or equal to 0.5 wt % of the second liquid, less than or equal to 0.2 wt % of the second liquid, less than or equal to 0.1 wt % of the second liquid, less than or equal to 0.05 wt % of the second liquid, less than or equal to 0.02 wt % of the second liquid, less than or equal to 0.01 wt % of the second liquid, less than or equal to 0.005 wt % of the second liquid, less than or equal to 0.002 wt % of the second liquid, less than or equal to 0.001 wt % of the second liquid, less than or equal to 0.0005 wt % of the second liquid, less than or equal to 0.0002 wt % of the second liquid, less than or equal to 0.0001 wt % of the second liquid, less than or equal to 0.00005 wt % of the second liquid, or less than or equal to 0.00002 wt % of the second liquid. Combinations of the above-referenced ranges are also possible (e.g., greater than or equal to 0.00001 wt % of the second liquid and less than or equal to 99.999 wt % of the second liquid). Other ranges are also possible. The wt % of the second molecule in the second liquid may be calculated by dividing the weight of the second molecule in the second liquid by the total weight of the second liquid. The total weight of the second liquid should be understood to include the second molecule, any solvents within the second liquid, and any further species dissolved or suspended in the second liquid.

In some embodiments, a second liquid as described herein may comprise water. Water may make up greater than or equal to 0.00001 wt % of the second liquid, greater than or equal to 0.00002 wt % of the second liquid, greater than or equal to 0.00005 wt % of the second liquid, greater than or equal to 0.0001 wt % of the second liquid, greater than or equal to 0.0002 wt % of the second liquid, greater than or equal to 0.0005 wt % of the second liquid, greater than or equal to 0.001 wt % of the second liquid, greater than or equal to 0.002 wt % of the second liquid, greater than or equal to 0.005 wt % of the second liquid, greater than or equal to 0.01 wt % of the second liquid, greater than or equal to 0.02 wt % of the second liquid, greater than or equal to 0.05 wt % of the second liquid, greater than or equal to 0.1 wt % of the second liquid, greater than or equal to 0.2 wt % of the second liquid, greater than or equal to 0.5 wt % of the second liquid, greater than or equal to 1 wt % of the second liquid, greater than or equal to 2 wt % of the second liquid, greater than or equal to 5 wt % of the second liquid, greater than or equal to 10 wt % of the second liquid, greater than or equal to 20 wt % of the second liquid, greater than or equal to 50 wt % of the second liquid, greater than or equal to 75 wt % of the second liquid, greater than or equal to 90 wt % of the second liquid, greater than or equal to 95 wt % of the second liquid, greater than or equal to 97.5 wt % of the second liquid, greater than or equal to 99 wt % of the second liquid, greater than or equal to 99.9 wt % of the second liquid, or greater than or equal to 99.99 wt % of the second liquid. In some embodiments, water may make up less than or equal to 99.999 wt % of the second liquid, less than or equal to 99.99 wt % of the second liquid, less than or equal to 99.9 wt % of the second liquid, less than or equal to 99 wt % of the second liquid, less than or equal to 97.5 wt % of the second liquid, less than or equal to 95 wt % of the second liquid, less than or equal to 90 wt % of the second liquid, less than or equal to 75 wt % of the second liquid, less than or equal to 50 wt % of the second liquid, less than or equal to 20 wt % of the second liquid, less than or equal to 10 wt % of the second liquid, less than or equal to 5 wt % of the second liquid, less than or equal to 2 wt % of the second liquid, less than or equal to 1 wt % of the second liquid, less than or equal to 0.5 wt % of the second liquid, less than or equal to 0.2 wt % of the second liquid, less than or equal to 0.1 wt % of the second liquid, less than or equal to 0.05 wt % of the second liquid, less than or equal to 0.02 wt % of the second liquid, less than or equal to 0.01 wt % of the second liquid, less than or equal to 0.005 wt % of the second liquid, less than or equal to 0.002 wt % of the second liquid, less than or equal to 0.001 wt % of the second liquid, less than or equal to 0.0005 wt % of the second liquid, less than or equal to 0.0002 wt % of the second liquid, less than or equal to 0.0001 wt % of the second liquid, less than or equal to 0.00005 wt % of the second liquid, or less than or equal to 0.00002 wt % of the second liquid. Combinations of the above-referenced ranges are also possible (e.g., greater than or equal to 0.00001 wt % of the second liquid and less than or equal to 99.999 wt % of the second liquid). Other ranges are also possible. The wt % of water in the second liquid may be calculated by dividing the weight of the water in the second liquid by the total weight of the second liquid. The total weight of the second liquid should be understood to include the second molecule, any solvents within the second liquid, and any further species dissolved or suspended in the second liquid.

In some embodiments, a second liquid as described herein may comprise one or more organic solvents. The organic solvent(s) may make up greater than or equal to 0.00001 wt % of the second liquid, greater than or equal to 0.00002 wt % of the second liquid, greater than or equal to 0.00005 wt % of the second liquid, greater than or equal to 0.0001 wt % of the second liquid, greater than or equal to 0.0002 wt % of the second liquid, greater than or equal to 0.0005 wt % of the second liquid, greater than or equal to 0.001 wt % of the second liquid, greater than or equal to 0.002 wt % of the second liquid, greater than or equal to 0.005 wt % of the second liquid, greater than or equal to 0.01 wt % of the second liquid, greater than or equal to 0.02 wt % of the second liquid, greater than or equal to 0.05 wt % of the second liquid, greater than or equal to 0.1 wt % of the second liquid, greater than or equal to 0.2 wt % of the second liquid, greater than or equal to 0.5 wt % of the second liquid, greater than or equal to 1 wt % of the second liquid, greater than or equal to 2 wt % of the second liquid, greater than or equal to 5 wt % of the second liquid, greater than or equal to 10 wt % of the second liquid, greater than or equal to 20 wt % of the second liquid, greater than or equal to 50 wt % of the second liquid, greater than or equal to 75 wt % of the second liquid, greater than or equal to 90 wt % of the second liquid, greater than or equal to 95 wt % of the second liquid, greater than or equal to 97.5 wt % of the second liquid, greater than or equal to 99 wt % of the second liquid, greater than or equal to 99.9 wt % of the second liquid, or greater than or equal to 99.99 wt % of the second liquid. In some embodiments, the organic solvent(s) may make up less than or equal to 99.999 wt % of the second liquid, less than or equal to 99.99 wt % of the second liquid, less than or equal to 99.9 wt % of the second liquid, less than or equal to 99 wt % of the second liquid, less than or equal to 97.5 wt % of the second liquid, less than or equal to 95 wt % of the second liquid, less than or equal to 90 wt % of the second liquid, less than or equal to 75 wt % of the second liquid, less than or equal to 50 wt % of the second liquid, less than or equal to 20 wt % of the second liquid, less than or equal to 10 wt % of the second liquid, less than or equal to 5 wt % of the second liquid, less than or equal to 2 wt % of the second liquid, less than or equal to 1 wt % of the second liquid, less than or equal to 0.5 wt % of the second liquid, less than or equal to 0.2 wt % of the second liquid, less than or equal to 0.1 wt % of the second liquid, less than or equal to 0.05 wt % of the second liquid, less than or equal to 0.02 wt % of the second liquid, less than or equal to 0.01 wt % of the second liquid, less than or equal to 0.005 wt % of the second liquid, less than or equal to 0.002 wt % of the second liquid, less than or equal to 0.001 wt % of the second liquid, less than or equal to 0.0005 wt % of the second liquid, less than or equal to 0.0002 wt % of the second liquid, less than or equal to 0.0001 wt % of the second liquid, less than or equal to 0.00005 wt % of the second liquid, or less than or equal to 0.00002 wt % of the second liquid. Combinations of the above-referenced ranges are also possible (e.g., greater than or equal to 0.00001 wt % of the second liquid and less than or equal to 99.999 wt % of the second liquid). Other ranges are also possible. The wt % of the organic solvent(s) in the second liquid may be calculated by dividing the weight of the organic solvent(s) in the second liquid by the total weight of the second liquid. The total weight of the second liquid should be understood to include the second molecule, any solvents within the second liquid, and any further species dissolved or suspended in the second liquid.

In some embodiments, a second liquid as described herein may further comprise one or more supplemental species. For example, the second liquid may comprise one or more of a desiccant (e.g., molecular sieves), a stabilizer, an antioxidant, a UV absorber, a filler particle, a foaming agent, a surfactant, a pigment, and a thinner.

In some embodiments, a latent curing agent (e.g., a blocked isocyanate such as blocked toluene diisocyanate) may make up a relatively large wt % of a second liquid as described herein. In some embodiments, the latent curing agent may make up greater than or equal to 1 wt % of the second liquid, greater than or equal to 2 wt % of the second liquid, greater than or equal to 5 wt % of the second liquid, greater than or equal to 10 wt % of the second liquid, greater than or equal to 20 wt % of the second liquid, greater than or equal to 30 wt % of the second liquid, greater than or equal to 40 wt % of the second liquid, greater than or equal to 50 wt % of the second liquid, or greater than or equal to 60 wt % of the second liquid. In some embodiments, the latent curing agent may make up less than or equal to 70 wt % of the second liquid, less than or equal to 60 wt % of the second liquid, less than or equal to 50 wt % of the second liquid, less than or equal to 40 wt % of the second liquid, less than or equal to 30 wt % of the second liquid, less than or equal to 20 wt % of the second liquid, less than or equal to 10 wt % of the second liquid, less than or equal to 5 wt % of the second liquid, or less than or equal to 2 wt % of the second liquid. Combinations of the above-referenced ranges are also possible (e.g., greater than or equal to 1 wt % of the second liquid and less than or equal to 70 wt % of the second liquid, or greater than or equal to 1 wt % of the second liquid and less than or equal to 50 wt % of the second liquid). Other ranges are also possible.

In some embodiments, a second liquid may comprise a surfactant (e.g., a silicone surfactant). The surfactant may make up greater than or equal to 0.001 wt % of the second liquid, greater than or equal to 0.002 wt % of the second liquid, greater than or equal to 0.005 wt % of the second liquid, greater than or equal to 0.01 wt % of the second liquid, greater than or equal to 0.02 wt % of the second liquid, greater than or equal to 0.05 wt % of the second liquid, greater than or equal to 0.1 wt % of the second liquid, greater than or equal to 0.2 wt % of the second liquid, greater than or equal to 0.5 wt % of the second liquid, greater than or equal to 1 wt % of the second liquid, greater than or equal to 2 wt % of the second liquid, or greater than or equal to 5 wt % of the second liquid. The surfactant may make up less than or equal to 10 wt % of the second liquid, less than or equal to 5 wt % of the second liquid, less than or equal to 2 wt % of the second liquid, less than or equal to 1 wt % of the second liquid, less than or equal to 0.5 wt % of the second liquid, less than or equal to 0.2 wt % of the second liquid, less than or equal to 0.1 wt % of the second liquid, less than or equal to 0.05 wt % of the second liquid, less than or equal to 0.02 wt % of the second liquid, less than or equal to 0.01 wt % of the second liquid, less than or equal to 0.005 wt % of the second liquid, or less than or equal to 0.002 wt % of the second liquid. Combinations of the above-referenced ranges are also possible (e.g., greater than or equal to 0.001 wt % of the second liquid and less than or equal to 10 wt % of the second liquid). Other ranges are also possible.

Figure 4A:
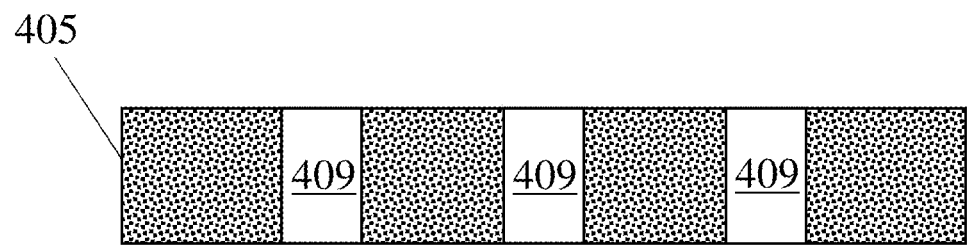
FIGS. 4A-4B depict platforms, according to certain embodiments.
Figure 4B:
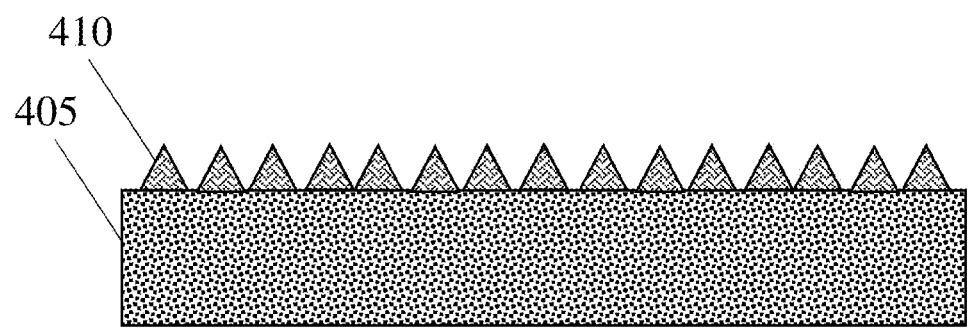

As described above, certain embodiments relate to inventive systems. In some embodiments, an inventive system may comprise a platform. The platform may have one or more advantageous features. For example, the platform may have one or more openings. FIG. 4A shows one embodiment of a platform 405 comprising optional openings 409. The openings may, in some embodiments, be configured to allow a liquid (e.g., a second liquid) to pass through the platform as it is translated. As another example, the platform may be textured. For instance, FIG. 4B shows one embodiment of a platform 405 comprising surface texture 410. As a third example, the platform may have a shape that promotes the formation of a 3D-printed article with a desirable geometry. For instance, the platform may be curved and/or the platform may comprise a footwear last. In some embodiments, the platform comprises a flat (or substantially flat) surface. In some embodiments, the platform may comprise a curved surface.

In some embodiments, an inventive system may comprise a vessel. The vessel may be comprise a heater and/or a cooler. In some cases, the heater and/or cooler may be configured to heat and/or cool a liquid inside the vessel (e.g., a second liquid) to a temperature of greater than or equal to 10° C., greater than or equal to 20° C., greater than or equal to 30° C., greater than or equal to 40° C., greater than or equal to 50° C., greater than or equal to 60° C., greater than or equal to 70° C., greater than or equal to 80° C., greater than or equal to 90° C., or greater than or equal to 100° C. In some embodiments, the heater and/or cooler may be configured to heat and/or cool a liquid inside the vessel to a temperature of less than or equal to 110° C., less than or equal to 100° C., less than or equal to 90° C., less than or equal to 80° C., less than or equal to 70° C., less than or equal to 60° C., less than or equal to 50° C., less than or equal to 40° C., less than or equal to 30° C., or less than or equal to 20° C. Combinations of the above-referenced ranges are also possible (e.g., greater than or equal to 10° C. and less than or equal to 110° C.). Other ranges are also possible. Non-limiting examples of suitable heaters include resistive heaters, convection heaters, ovens, and heat exchangers. Non-limiting examples of suitable coolers include Peltier coolers and heat exchangers.

In some embodiments, an inventive system may comprise a nozzle. The nozzle may be an ink jet head, or a variety of other suitable articles configured to dispense a first liquid. In some embodiments, the system may comprise at least two nozzles. In such embodiments, one or more nozzles may be the same, or each nozzle may be different. For instance, different nozzles may be configured to deliver different types of fluids and/or to deliver fluids at different rates. In some embodiments, the system may comprise an array of ink jet heads. The ink jet heads may be employed simultaneously and/or sequentially and/or may be configured to deposit one or more liquids simultaneously or sequentially. In certain cases, a method may comprise depositing a first liquid from at least two nozzles (such as ink jet heads) simultaneously and/or sequentially. In some embodiments, a method may comprise forming a solid material (e.g., a solid layer) by depositing one or more liquids onto a second liquid from an array of nozzles (such as ink jet heads) in a single pass of the array of nozzles over the platform. The array of nozzles may deposit liquid simultaneously as the array passes over the platform, or the nozzles may sequentially deposit liquid as they pass over the platform.

In some embodiments, an inventive system may further comprise one or more supplemental components. For example, the system may further comprise one or more components configured to dispense a fluid and/or to 3D-print a material, such as a direct write head, a reactive direct-write head, a spray valve, and/or a valve jet.

In some embodiments, an inventive system may be contained within an enclosure. The enclosure may be configured to allow an operator to adjust one or more ambient properties within the enclosure, such as a humidity within the enclosure, a temperature within the enclosure, and/or a gas composition within the enclosure. In some embodiments, the enclosure may be configured to have a humidity (e.g., a humidity selected by an operator) of greater than or equal to 0% relative humidity (RH), greater than or equal to 5% RH, greater than or equal to 10% RH, greater than or equal to 15% RH, greater than or equal to 20% RH, greater than or equal to 25% RH, greater than or equal to 30% RH, greater than or equal to 35% RH, greater than or equal to 40% RH, or greater than or equal to 45% RH. In some embodiments, the enclosure may be configured to have a humidity of less than or equal to 50% RH, less than or equal to 45% RH, less than or equal to 40% RH, less than or equal to 35% RH, less than or equal to 30% RH, less than or equal to 25% RH, less than or equal to 20% RH, less than or equal to 15% RH, less than or equal to 10% RH, or less than or equal to 5% RH. Combinations of the above-referenced ranges are also possible (e.g., greater than or equal to 0% RH and less than or equal to 50% RH). Other ranges are also possible.

In some embodiments, an enclosure may further comprise one or more additional chambers. Non-limiting examples of additional chambers include washing chambers, heat curing chambers, incubators, and UV curing chambers. In some embodiments, the enclosure may protect an operator from flying debris. The enclosure may include a door with a handle to provide an operator access to the system. The door may include a window to allow an operator to see the system without opening the door.

In some embodiments, the window may be constructed from a material that blocks certain wavelengths of light (e.g., blocking at least 95%, at least 98%, or at least 99% of the light of those wavelength(s)). For example, the system may employ a curing element that emits UV light that may be harmful to humans. In this example, the window may be constructed from a UV blocking material (e.g., a material that blocks at least 95% of UV light, a material that blocks at least 98% of UV light, or a material that blocks at least 99% of UV light) that is transparent (e.g., transmits at least 50% of visible light). The UV blocking material that is transparent may include, for example, a UV filtering acrylic.

It should be appreciated that various alterations may be made to the enclosure without departing from the scope of the present disclosure. For example, enclosure may include one or more windows separate from the window in the door. Additionally (or alternatively), the enclosure may include multiple doors to ease operator access to the machine.

In some embodiments, a solid material, solid layer, and/or article described herein may be configured to be suitable for one or more applications. For instance, the solid material or layer may be configured to be a component of a shoe, such as a component of a shoe sole; a component of a wearable device; a component of a foam; a component of an autopart; a component of a medical device; a component of a soft robotic part; and/or a component of a shock absorber.

The following examples are intended to illustrate certain embodiments of the present invention, but do not exemplify the full scope of the invention.

Example 1

Figure 5:
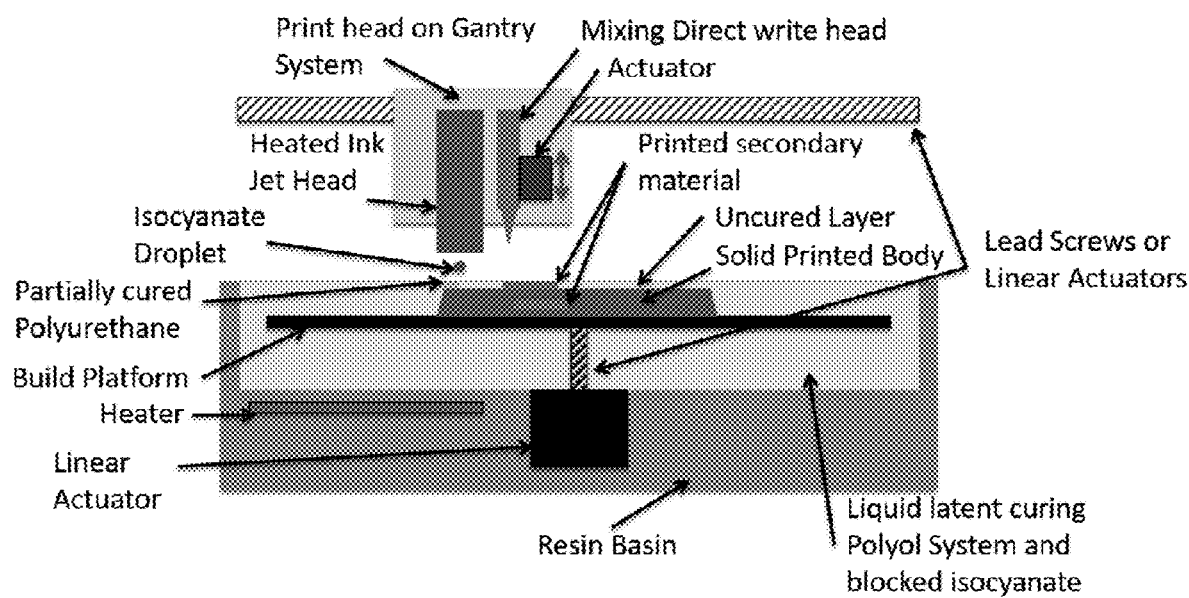
FIG. 5 depicts a system for forming solid materials, according to certain embodiments.

This Example describes a system in accordance with certain embodiments described herein. This exemplary system is shown in FIG. 5.

The system comprises a print-head on a moveable XY gantry system situated above a heated vessel that holds a second liquid such as an unreacted resin. A platform is situated inside of the vessel with the flat surface of the platform substantially parallel to the top surface of the second liquid. The platform is connected to a linear actuator, and may be translated in a direction perpendicular to the top surface of the second liquid. The platform may be able to travel throughout the whole depth of the resin tank, and may also move up above the second liquid to expose the final 3D-printed article to the outside environment and drain excess second liquid off of the final 3D-printed article. The platform may comprise one or more openings which may allow the second liquid to flow through it, and/or may also have surface texturing to promote adhesion of the parts to it. The nozzle may be a single heated ink-jet head that is configured to deposit a droplet the first liquid. The first liquid may comprise a first molecule that is capable of reacting with a second molecule in the second liquid contained in the vessel at locations wherever it contacts the second liquid. In some embodiments, the system may include multiple types of inkjet heads, and may be configured to deposit different types of liquids (e.g., a first liquid and a third liquid; a first liquid, a third liquid, and a fourth liquid, etc.), other additives, and/or pigments. In some embodiments, the system may include other types of dispensers such as a direct-write head (e.g., a paste extruder), a reactive direct-write head, one or more spray valves, one or more valve jets and/or other deposition devices. By having multiple types of printheads that are situated above the second liquid, an operator may be able to locally change the properties of a final 3D-printed article, such as: porosity, stiffness, color, hardness, density, and the like. In some embodiments, the properties may be those described in U.S. Provisional Patent Application No. 62/464,364 entitled "Systems and Methods for Three-Dimensional Printing of Footwear and Other Articles", U.S. Provisional Patent Application No. 62/555,897 entitled "Systems and Methods of 3D Printing Articles of Footwear with Property Gradients", U.S. Provisional Patent Application No. 62/555,904 entitled "3D Printed Articles of Footwear with Property Gradients", and U.S. Provisional Patent Application No. 62/555,916 entitled "3D Printed Articles of Footwear with Sensors and Methods of Forming the Same", each of which is incorporated by reference herein in its entirety. In some cases, some or all of the build area or the system may be situated in an enclosure in which an operator can control one or more atmospheric conditions such as humidity, gas composition, and temperature. In some embodiments, the system may include secondary chambers for things like washing, heat curing, or UV curing. In some examples, the second liquid may also contain a latent curing agent that may be activated by an external stimulus. The second liquid and/or the 3D-printed article may not be exposed to the stimulus during printing. The latent curing agent may remain uncured as the 3D-printed article is removed from the second liquid and drained of excess second liquid. After these steps, any remaining latent curing agent (e.g., latent curing agent present on the surface of the 3D-printed article) may be cured by exposure to the stimulus. The remaining resin on the surface may densify during curing, may have a smoother surface finish after curing as compared to before curing, and/or have overall better mechanical properties as compared to before curing. In some embodiments, a step of curing the latent curing agent may be substituted for a step of washing the 3D-printed article.

Example 2

This Example describes exemplary first and second liquids that can be used in accordance with certain inventive systems described herein.

An exemplary first liquid is pure MDI (Methylene diphenyl diisocyanate). MDI reacts quickly with alcohol and amine groups. Above its melting point of 40° C., MDI has a viscosity below 15 cP and is suitable for inkjetting. The viscosity of MDI may be increased by adding small amounts of isocyanate prepolymers. Other forms of isocyanates other than MDI could also be used.

An exemplary second liquid may include 5 parts butane diol, 9 parts 700 molecular weight polyether triol with ethylene oxide modification, 79 parts 2000 molecular weight polyether diol, 3 parts molecular sieve with 3 angstrom pores (a desiccant), 2 parts bismuth organometallic catalyst, 0.5 parts UV stabilizer, 0.5 parts water, and 1 part silicone surfactant. In some cases, the second liquid may also contain a latent curing agent. The latent curing agent may be a blocked isocyanate such as blocked-TDI. The latent curing agent may make up to 70% by weight of the second liquid.

Example 3

This Example describes an exemplary method for 3D-printing. An exemplary process flow diagram describing this method is shown in FIG. 6.

Figure 6:
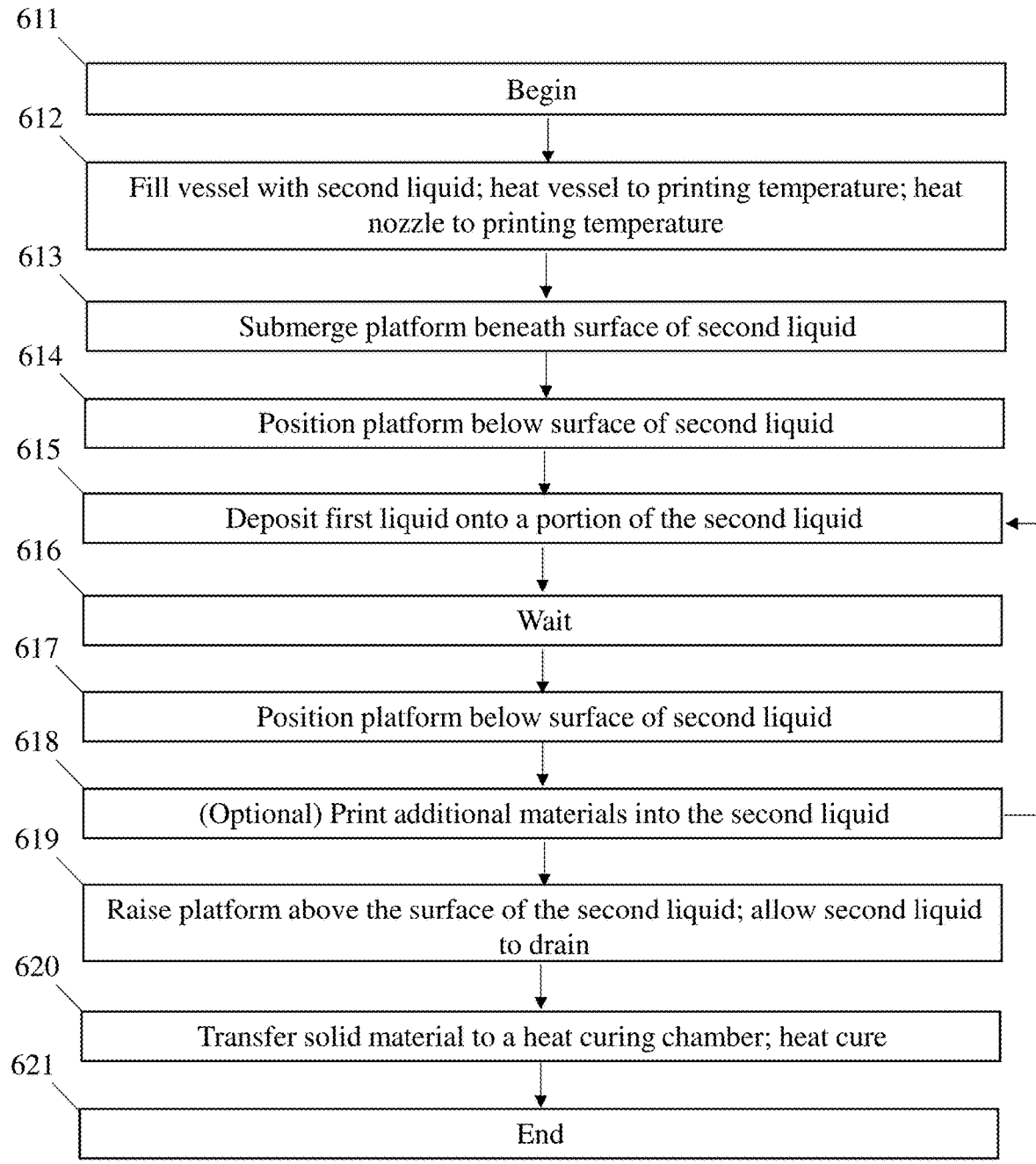
FIG. 6 depicts a process flow diagram for forming a solid material, according to certain embodiments.

As shown in FIG. 6, the process may begin with step 611. Then, step 612 may be performed by filling the vessel is with a second liquid and heating the vessel to the printing temperature. During this step, the nozzle may also be heated to the printing temperature. Then, as shown in step 613, the platform may be submerged beneath the surface of the second liquid. Next, as shown in step 614, the platform may be positioned below the surface of the second liquid. The distance below the surface of the second liquid may be a pre-determined distance, and/or may be a distance that promotes the formation of a solid material (e.g., a solid layer) with a desired thickness. Then, as shown in step 615, the first liquid may be deposited onto a portion of the second liquid. After this step, no action may be taken by the system for an amount of time, as shown in step 616. The first liquid may react with the second liquid during this time. At the conclusion of the waiting step, the platform may once again be positioned below the surface of the second liquid, such as at a pre-determined distance and/or a distance that promotes the formation of a solid material (e.g., a solid layer) with a desired thickness. This step is shown as step 617 in FIG. 6. Optionally, step 617 may be followed by step 618, in which additional materials are printed into the second liquid. Then, steps 615-618 may be repeated as many times as desired to form a solid material (e.g., a solid material comprising one or more solid layers). Next, the platform may be raised above the surface of the second liquid, and the second liquid may be drained from the solid material as described in step 619. Then, as shown in step 620, the solid material may be transferred to a heat curing chamber and may undergo a heat curing step. After this step, the process may end, as shown in step 621.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for forming a 3D-printed article, comprising:
    expelling a first liquid comprising first molecules having first functional groups from a nozzle positioned above a surface of a second liquid comprising second molecules having second functional groups;
    depositing the first liquid onto a portion of the surface of the second liquid such that the first functional groups react with the second functional groups to form a solid material in a pattern, the solid material having an average thickness of less than 200 microns,
    wherein:
        the portion of the second liquid is positioned over a top surface of a platform that is at least partially submerged within the second liquid, a distance between the surface of the second liquid and the top surface of the platform is less than 200 microns, and the platform is translated laterally within a vessel in which it is positioned.

2. A method for forming a 3D-printed article, comprising:

expelling a first liquid from a nozzle positioned above a surface of a second liquid;

depositing the first liquid onto a portion of the surface of the second liquid to initiate a chemical reaction resulting in the formation of a solid layer having an average thickness of less than 200 microns, wherein the portion of the second liquid is positioned over a top surface of a platform that is at least partially submerged within the second liquid, a distance between the surface of the second liquid and the top surface of the platform is less than 200 microns, and the platform is configured to be rotated around one or more axes.

3. The method of claim 2, further comprising applying ultrasonic vibrations to the second liquid to aid mixing of the first and second liquids.

4. A method as in claim 2, wherein the solid layer is not a continuous layer.

5. A method as in claim 2, wherein the solid layer comprises voids.

6. A method as in claim 2, further comprising lowering the platform.

7. A method as in claim 2, further comprising lowering the platform by a distance of greater than or equal to 1 micron and less than or equal to 200 microns.

8. A method as in claim 6, wherein lowering the platform comprises at least partially submerging the solid layer beneath the second liquid such that at least a portion of the second liquid is positioned over the platform.

9. A method as in claim 2, further comprising depositing the first liquid onto the portion of the second liquid that is positioned over the platform to form a second solid layer on the solid layer.

10. A method as in claim 2, further comprising depositing one or more additional materials onto the solid layer.

11. A method as in claim 2, wherein the first liquid comprises first molecules having first functional groups, the second liquid comprises second molecules having second functional groups, and solid layer comprises a reaction product of the first molecule and the second molecule.

12. A method as in claim 11, wherein the reaction product is substantially free from the first molecule or the second molecule.

13. A method as in claim 2, wherein reacting the chemical reaction comprises forming a polymer.

14. A method as in claim 2, wherein first liquid comprises first molecules having first functional groups, the second liquid comprises second molecules having second functional groups, and reacting the first functional group with the second functional group comprises catalyzing a reaction of one or both of the first molecule and the second molecule.

15. A method as in claim 2, wherein first liquid comprises first molecules having first functional groups, the second liquid comprises second molecules having second functional groups, and reacting the first functional group with the second functional group comprises precipitating one or both of the first molecule and the second molecule.

16. A method as in claim 2, further comprising removing the solid layer from the second liquid.

17. A method as in claim 2, further comprising activating a latent curing agent present in the first liquid or the second liquid.

18. A method as in claim 2, wherein the platform comprises one or more openings.

19. A method as in claim 2, wherein the first liquid comprises a pigment.

20. A method for forming a 3D-printed article, comprising:

expelling a first liquid comprising first molecules having first functional groups from a nozzle positioned above a surface of a second liquid comprising second molecules having second functional groups;

depositing the first liquid onto a portion of the surface of the second liquid such that the first functional groups react with the second functional groups to form a solid material in a pattern, the solid material having an average thickness of less than 200 microns, wherein:

the portion of the second liquid is positioned over a top surface of a platform that is at least partially submerged within the second liquid, a distance between the surface of the second liquid and the top surface of the platform is less than 200 microns, and the platform is configured to be rotated around one or more axes.

* * * * *